United States Patent
Ito et al.

(10) Patent No.: US 11,265,705 B2
(45) Date of Patent: Mar. 1, 2022

(54) COMMUNICATION SYSTEM, COMMUNICATION TERMINAL, AMF ENTITY, AND COMMUNICATION METHOD

(71) Applicant: NEC Corporation, Tokyo (JP)

(72) Inventors: Hironori Ito, Tokyo (JP); Anand Raghawa Prasad, Tokyo (JP); Sivabalan Arumugam, Chennai (IN); Sivakamy Lakshminarayanan, Chennai (IN); Naoaki Suzuki, Tokyo (JP); Andreas Kunz, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 407 days.

(21) Appl. No.: 16/478,348

(22) PCT Filed: Jan. 17, 2018

(86) PCT No.: PCT/JP2018/001185
§ 371 (c)(1),
(2) Date: Jul. 16, 2019

(87) PCT Pub. No.: WO2018/135524
PCT Pub. Date: Jul. 26, 2018

(65) Prior Publication Data
US 2019/0373461 A1 Dec. 5, 2019

(30) Foreign Application Priority Data

Jan. 17, 2017 (IN) .............................. 201711001823
Jan. 27, 2017 (IN) .............................. 201711003074

(51) Int. Cl.
*H04L 29/06* (2006.01)
*H04W 12/041* (2021.01)
(Continued)

(52) U.S. Cl.
CPC ......... *H04W 12/041* (2021.01); *H04L 9/0861* (2013.01); *H04W 8/02* (2013.01);
(Continued)

(58) Field of Classification Search
None
See application file for complete search history.

(56) References Cited

U.S. PATENT DOCUMENTS 7,626,963 B2 * 12/2009 Patel ..................... H04L 9/0844
370/331
7,882,346 B2 * 2/2011 O'Neill ............... H04W 12/041
713/153
(Continued)

FOREIGN PATENT DOCUMENTS

JP      2016-506204      2/2016

OTHER PUBLICATIONS

Oberle, Karsten et al. Enhanced Methods for SIP based Session Mobility in a Converged Network. 2007 16th IST Mobile and Wireless Communications Summit. https://ieeexplore.ieee.org/stamp/stamp.jsp?tp=&arnumber=4299043 (Year: 2007).*

(Continued)

*Primary Examiner* — Jeremiah L Avery

(57) ABSTRACT

The present disclosure aims to provide a communication system capable of achieving advanced security in a 5G communication system. The communication system according to the present disclosure includes: a communication terminal (10); an Access and Mobility Management (AMF) entity (20) configured to execute Mobility Management (MM) processing regarding the communication terminal (10); and a Session Management Function (SMF) entity (30) configured to execute Session Management (SM) processing regarding the communication terminal (10), in which the communication terminal (10) sends an MM message used in (Continued)

the MM processing, a first security key having been applied to the MM message, between the communication terminal and the AMF entity (20), and sends an SM message used in the SM processing, a second security key having been applied to the SM message, between the communication terminal and the SMF entity (30) via the AMF entity (20).

12 Claims, 21 Drawing Sheets

(51) Int. Cl.
*H04L 9/08* (2006.01)
*H04W 8/02* (2009.01)
*H04W 12/037* (2021.01)
*H04W 12/106* (2021.01)
*H04W 12/0431* (2021.01)

(52) U.S. Cl.
CPC ..... *H04W 12/037* (2021.01); *H04W 12/0431* (2021.01); *H04W 12/106* (2021.01); *H04L 2209/80* (2013.01)

(56) References Cited

U.S. PATENT DOCUMENTS

| | | | | |
|---|---|---|---|---|
| 7,969,945 | B2* | 6/2011 | Navali | H04W 12/03 370/331 |
| 8,037,305 | B2* | 10/2011 | Rahman | H04N 21/4126 713/168 |
| 9,300,641 | B2* | 3/2016 | Laitinen | H04L 63/06 |
| 2016/0295398 | A1* | 10/2016 | Ketheesan | H04W 4/12 |
| 2017/0111339 | A1* | 4/2017 | Lee | H04L 9/00 |
| 2017/0272945 | A1* | 9/2017 | Link, II | H04L 9/3242 |

OTHER PUBLICATIONS

Jung, Younchan; Atwood, J. William. Secure smart phones fitted to mobile Ad hoc networks and devices for security control. ICTC 2011. https://ieeexplore.ieee.org/stamp/stamp.jsp?tp=&arnumber= 6082595 (Year: 2011).*

International Search Report in the corresponding PCT International Application.

Huawei et al.; "Service Request Procedure", SA WG2 Meeting #118bis, S2-170307, pp. 1-7, (Jan. 2017).

3GPP TR 33.899 V0.5.0 (Oct. 2016), "3$^{rd}$ Generation Partnership Project; Technical Specification Group Services and System Aspects; Study on the Security Aspects of the Next Generation System, (Release 14)", pp. 1-244, (Oct. 2016).

ZTE et al.; "Proposed Network Slicing Update to 23.501 Clause 5.13", SA WG2 Meeting #118bis, S2-170324, pp. 1-4, (Jan. 2017).

ZTE; "Key Hierarchy Schems for Network Slicing", 3GPP TSG SA WG3 (Security) Meeting #84, S3-160965, pp. 1-6, (Jul. 2016).

3GPP TR 23.799 V14.0.0 (Dec. 2016), "3$^{rd}$ Generation Partnership Project; Technical Specification Group Services and System Aspects; Study on Architecture for Next Generation System, (Release 14)", pp. 1-522, (Dec. 2016).

Office Action, dated Oct. 8, 2019, issued by the European Patent Office in counterpart European Patent Application No. 18741554.2.

"3rd Generation Partnership Project; Technical Specification Group Services and System Aspects; Study on the security aspects of the next generation system (Release 14)", 3GPP Standard; 3GPP TR 33.899, V0.6.0, pp. 1-375, Nov. 25, 2016.

NEC: "pCR to TR 33.899 Security procedure for NextGen networks", 3GPP Draft; S3-170161, pp. 1-5, Jan. 30, 2017.

* cited by examiner

COMMUNICATION SYSTEM, COMMUNICATION TERMINAL, AMF ENTITY, AND COMMUNICATION METHOD

CROSS-REFERENCE TO RELATED PATENT APPLICATIONS

This application is a National Stage Entry of International Application No. PCT/JP2018/001185, filed Jan. 17, 2018, which claims priority from Indian Patent Application No. 201711001823, filed Jan. 17, 2017 and Indian Patent Application No. 201711003074, filed Jan. 27, 2017. The entire contents of the above-referenced applications are expressly incorporated herein by reference.

TECHNICAL FIELD

The present disclosure relates to a communication system, a communication terminal, an Access and Mobility Management Function (AMF) entity, and a communication method providing security between a communication terminal and a network.

BACKGROUND ART

In recent years, as a radio communication system used between a communication terminal and a base station, Long Term Evolution (LTE), which is a standard defined by the 3rd Generation Partnership Project (3GPP), has become widespread. LTE is a radio communication system used to achieve high speed and large capacity radio communication. Further, as a core network that accommodates a radio network that uses LTE, a packet network called System Architecture Evolution (SAE), Evolved Packet Core (EPC) or the like is defined by the 3rd Generation Partnership Project (3GPP).

In the 3GPP, a radio communication system that achieves a higher speed and a larger capacity than those in LTE has been discussed, and a method of achieving a core network that accommodates a radio network that uses this radio communication system has also been discussed. This communication system may be referred to as a Next Generation (NextGen) System, a 5G communication system or the like. Further, the radio network used in the NextGen System may be referred to as Next Generation (NG) Radio Access Network (RAN).

Non-Patent Literature 1 discloses, in Sections 5.3 and 5.4, a configuration of a next-generation communication system. Non-Patent Literature 1 defines contents of processing regarding Mobility Management (MM) and Session Management (SM) regarding User Equipment (UE), which is a communication terminal.

Specifically, MM may include registration of a UE or a user who manages the UE in a mobile network and support of reachability for enabling mobile terminated communication. Further, MM may include detection of unreachable UE, allocation of a network function regarding Control (C)-Plane and User (U)-Plane, limitation of mobility or the like.

Further, the SM is to perform configuration of IP connectivity or non-IP connectivity for UE. In other words, the SM may include management or control of connectivity of the U-Plane.

In regard to the 3GPP, a discussion regarding Internet of Things (IoT) service has been taking place. In the IoT service, a large number of terminals that autonomously execute communication (hereinafter these terminals will be referred to as IoT terminals) without requiring a user's operation are used. In order to enable a service provider to provide the IoT service using a large number of IoT terminals, it has been desired to efficiently accommodate a large number of IoT terminals in a mobile network managed by a communication carrier or the like. The mobile network is a network including a radio network and a core network.

Non-Patent Literature 1 discloses, in Annex B, a configuration of a core network to which network slicing is applied. The network slicing is a technique for dividing a core network for each service to be provided in order to efficiently accommodate a large number of IoT terminals. Further, Non-Patent Literature 1 discloses, in Section 5.1, that customization and optimization are necessary for each divided network (a network slice system or a network slice).

CITATION LIST

Non Patent Literature

[Non-Patent Literature 1] 3GPP TR23.799 V14.0.0 (2016-12) 5.3, 5.4, Annex B

SUMMARY OF INVENTION

Technical Problem

Non-Patent Literature 1 does not disclose, however, how to achieve security regarding the MM and the SM. Therefore, there is a problem that it is impossible to provide advanced security for the user in the 5G communication system.

An object of the present disclosure is to provide a communication system, a communication terminal, an AMF entity, and a communication method capable of achieving advanced security in the 5G communication system.

Solution to Problem

A communication system according to a first aspect of the present disclosure includes: a communication terminal; an Access and Mobility Management Function (AMF) entity configured to execute Mobility Management (MM) processing regarding the communication terminal; and a Session Management Function (SMF) entity configured to execute Session Management (SM) processing regarding the communication terminal, in which the communication terminal sends an MM message used in the MM processing, a first security key having been applied to the MM message, between the communication terminal and the AMF entity, and sends an SM message used in the SM processing, a second security key having been applied to the SM message, between the communication terminal and the SMF entity via the AMF entity.

A communication terminal according to a second aspect of the present disclosure includes: a controller configured to apply a first security key to an MM message used in MM processing and apply a second security key to an SM message used in SM processing; and a communication unit configured to send the MM message to which the first security key has been applied to an AMF entity that executes the MM processing and send the SM message to which the second security key has been applied to an SMF entity that executes the SM processing via the AMF entity.

An AMF entity according to a third aspect of the present disclosure includes: a controller configured to execute MM processing using an MM message to which a first security key has been applied; and a communication unit configured to forward an SM message sent between a communication terminal and an SMF entity that executes SM processing, a second security key having been applied to the SM message.

A communication method according to a fourth aspect of the present disclosure includes: applying a first security key to an MM message used in MM processing; sending the MM message to which the first security key has been applied to an AMF entity that executes the MM processing; applying a second security key to an SM message used in SM processing; and sending the SM message to which the second security key has been applied to an SMF entity that executes the SM processing via the AMF entity.

Advantageous Effects of Invention

According to the present disclosure, it is possible to provide a communication system, a communication terminal, an AMF entity, and a communication method capable of achieving advanced security in the 5G communication system.

DESCRIPTION OF EMBODIMENTS

First Example Embodiment

Figure 1:
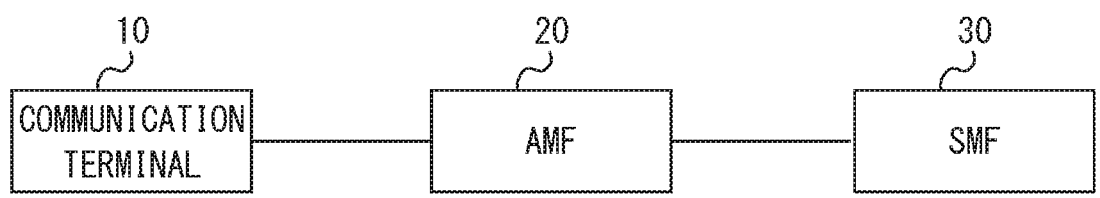
FIG. 1 is a configuration diagram of a communication system according to a first example embodiment.

Hereinafter, with reference to the drawings, example embodiments of the present disclosure will be explained. With reference to FIG. 1, a configuration example of a communication system according to the first example embodiment of the present disclosure will be explained. The communication system shown in FIG. 1 includes a communication terminal 10, an Access and Mobility Management Function (AMF) entity (hereinafter this entity is referred to as an AMF) 20, and a Session Management Function (SMF) entity (hereinafter it will be referred to as an SMF) 30. The communication terminal 10, the AMF 20, and the SMF 30 may each be a computer apparatus operated by a processor executing a program stored in a memory.

The communication terminal 10 may be a mobile telephone terminal, a smartphone terminal, a tablet terminal or the like. Alternatively, the communication terminal 10 may be an Internet of Things (IoT) terminal, a Machine Type Communication (MTC) terminal, a Machine to Machine (M2M) terminal or the like.

The AMF 20 executes MM processing regarding the communication terminal 10. The SMF 30 executes SM processing regarding the communication terminal 10. The AMF 20 and the SMF 30 are each defined as an entity arranged in a core network in the 3GPP.

The MM processing is executed using an MM message sent between the communication terminal 10 and the AMF 20. A security key for the MM message is applied to the MM message. A security key for the MM message includes, for example, at least one of an encryption key for encrypting the MM message and an integrity protection key for guaranteeing integrity of the MM message.

The SM processing is executed using an SM message sent between the communication terminal 10 and the SMF 30 via the AMF 20. A security key for the SM message is applied to the SM message. The security key for the SM message includes, for example, at least one of an encryption key for encrypting the SM message and an integrity protection key for guaranteeing integrity of the SM message.

As described above, the communication terminal 10 shown in FIG. 1 is able to apply a security key different from the security key to be applied to the MM message to the SM message. In the 5G communication system, the SM processing is executed in the SMF 30, which is an entity different from the AMF 20 that executes the MM processing. The communication terminal 10 is able to apply different security keys to the SM message and the MM message in a communication system in which the SM processing and the MM processing are executed in entities different from each other.

As described above, the 5G communication system is able to provide advanced security for the UE or the user by applying different security keys to the SM message and the MM message.

Second Example Embodiment

Figure 2:
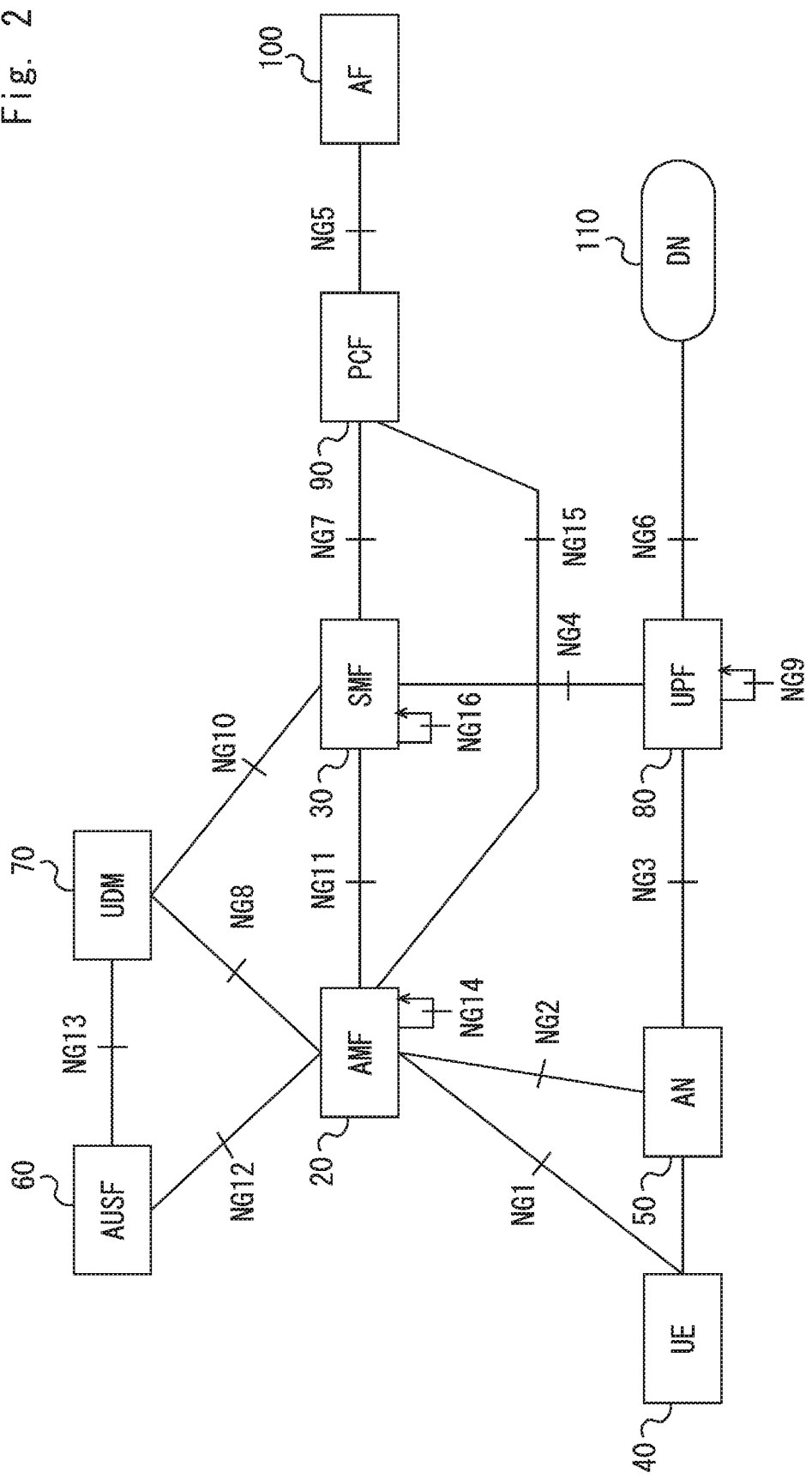
FIG. 2 is a configuration diagram of a communication system according to a second example embodiment.

With reference next to FIG. 2, a configuration example of a communication system according to a second example embodiment will be explained. The communication system shown in FIG. 2 includes an AMF 20, an SMF 30, a UE 40, an Access Network (AN) 50, and an Authentication Server Function (AUSF) entity (hereinafter it will be referred to as an AUSF) 60. Further, the communication system shown in FIG. 2 includes a Unified Data Management (UDM) entity (hereinafter it will be referred to as a UDM) 70 and a User Plane Function (UPF) entity (hereinafter it will be referred to as a UPF) 80. Further, the communication system shown in FIG. 2 includes a Policy Control Function (PCF) entity (hereinafter it will be referred to as a PCF) 90, an Application Function (AF) entity (hereinafter it will be referred to as an AF) 100, and a Data Network (DN) 110.

The functions and the operations of the AMF 20, the SMF 30, the UE 40, the AN 50, the AUSF 60, the UDM 70, the UPF 80, the PCF 90, the AF 100, and the DN 110 are defined by the 3GPP. The UE 40 corresponds to the communication terminal 10 shown in FIG. 1. The AN 50 includes, for example, an apparatus that corresponds to a base station that performs radio communication with the UE 40. The AN may be referred to, for example, as a Radio AN. The DN 110 is a general network in which data is sent.

An NG1 is a reference point between the UE 40 and the AMF 20. An NG2 is a reference point between the AN 50 and the AMF 20. An NG3 is a reference point between the AN 50 and the UPF 80. An NG4 is a reference point between the SMF 30 and the UPF 80. An NG5 is a reference point between the PCF 90 and the AF 100. An NG6 is a reference point between the UPF 80 and the DN 10. An NG7 is a reference point between the SMF 30 and the PCF 90. An NG8 is a reference point between the UDM 70 and the AMF 20. An NG9 is a reference point between the two UPFs 80. An NG10 is a reference point between the UDM 70 and the SMF 30. An NG11 is a reference point between the AMF 20 and the SMF 30. An NG12 is a reference point between the AMF 20 and the AUSF 60. An NG13 is a reference point between the AUSF 60 and the UDM 70. An NG14 is a reference point between the two AMFs 20. An NG15 is a reference point between the PCF 90 and the AMF 20. An NG16 is a reference point between the two SMFs 30.

The UDM 70 holds, for example, subscriber data, policy data, or security authentication information (security credential). The security authentication information may be, for example, a security key K.

The AUSF 60 executes authentication regarding whether the UE 40 can be connected to a core network that composes the 5G communication system (hereinafter it will be referred to as a 5G core network).

The UPF 80 configures a PDU session and forwards User data. The PCF 90 sends policy rules regarding the 5G communication system to an entity or a node apparatus in a core network. The AF 100 provides an application service. The DN 110 is a network that sends the user data.

When the network slicing has been applied to the core network and a plurality of network slices have been generated, the SMF 30 and the UPF 80 are arranged for each network slice. Further, while only one UE 40 is shown in FIG. 2, a plurality of UEs 40 may be present.

Figure 3:
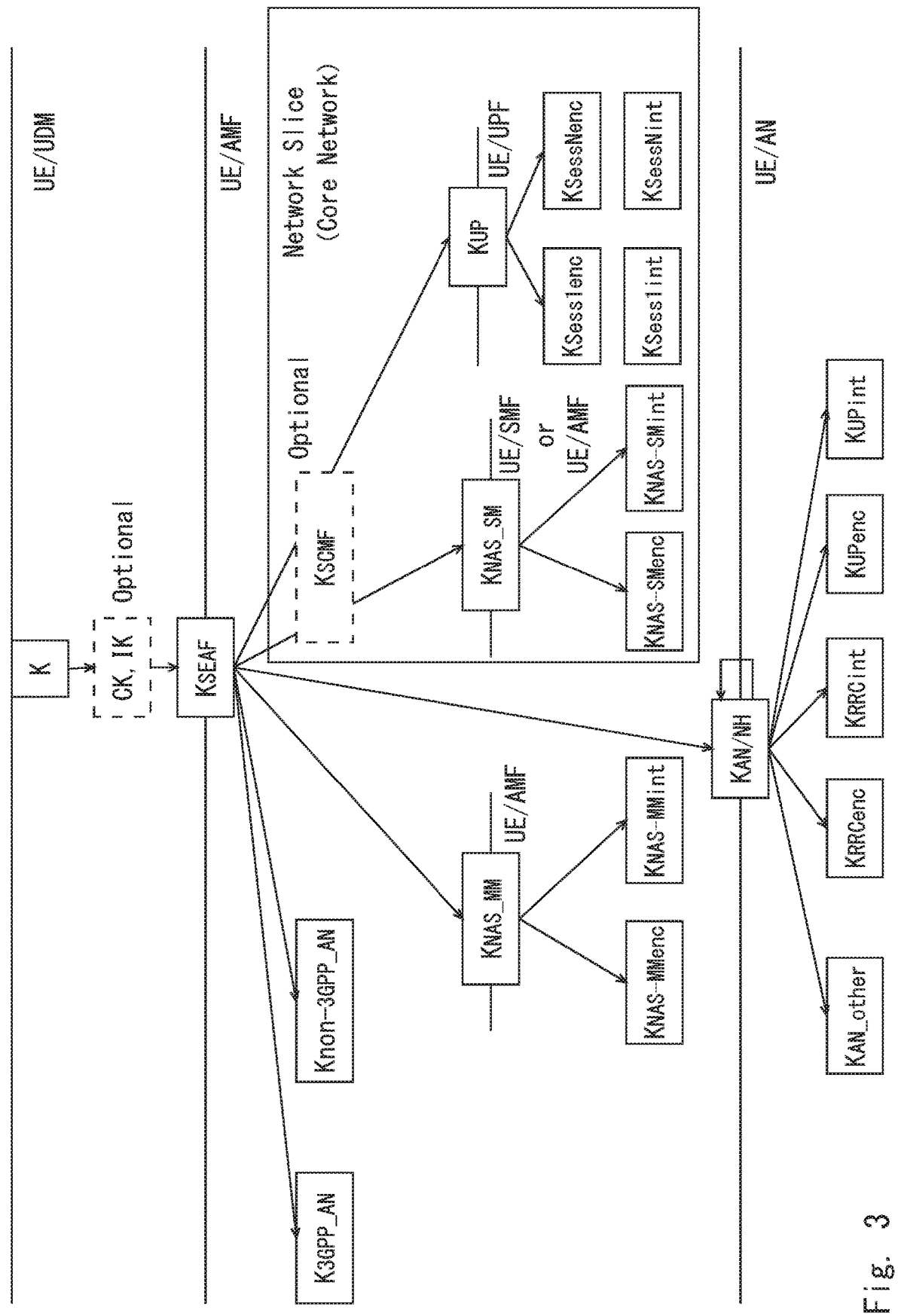
FIG. 3 is a configuration diagram of a security key according to the second example embodiment.

With reference next to FIG. 3, a configuration of the security key used in the communication system shown in FIG. 2 will be explained.

The UE 40 and the UDM 70 each include a security key K. The security key K may be referred to as a master key K. The UDM 70 may execute an Authentication Credential Repository and Processing Function (ARPF).

The UE 40 and the UDM 70 derive a security key $K_{SEAF}$ from the security key K. Alternatively, the UE 40 and the UDM 70 may derive a Ciphering Key (CK) used for encryption and an Integrity Key (IK) used for integrity protection processing from the security key K. Further, the UE 40 and the UDM 70 may derive the security key $K_{SEAF}$ from the security key K, or the CK and the IK. The UDM 70 sends the security key $K_{SEAF}$ to the AMF 20 via the AUSF 60. Alternatively, the UDM 70 may send the security key $K_{SEAF}$ to the AMF 20 via the reference point NG8.

The UE 40 and the AMF 20 derive a security key $K_{3GPP\_AN}$, a security key $K_{non\text{-}3GPP\_AN}$, a security key $K_{NAS\_MM}$, a security key $K_{NAS\_SM}$, a security key $K_{UP}$, and a security key $K_{AN/NH}$ from the security key $K_{SEAF}$. The AMF 20 may execute a Security Anchor Function (SEAF) and a Security Context Management Function (SCMF).

The UE 40 and the AMF 20 may derive a security key $K_{SCMF}$ from the security key $K_{SEAF}$. Further, the UE 40 and the AMF 20 may derive a security key $K_{NAS\_SM}$ and a security key $K_{UP}$ from the security key $K_{SCMF}$. The UE 40 and the AMF 20 derive the security key $K_{NAS\_SM}$ and the security key $K_{UP}$ from the security key $K_{SCMF}$ for each network slice using information for identifying the network slice in which the SMF 30 is arranged.

The security key $K_{3GPP\_AN}$ is a security key used in an access network used before LTE. The access network used before LTE includes, for example, an access network using a communication system called LTE, 3G, or 2G. The security key $K_{non\text{-}3GPP\_AN}$ is a security key used in an access network that is not defined by the 3GPP.

The security key $K_{NAS\_MM}$ is used in the MM processing. The security key $K_{NAS\_SM}$ is used in the SM processing. The security key $K_{UP}$ is applied to U-Plane data.

The UE 40 and the AMF 20 derive a security key $K_{NAs\text{-}MMenc}$ and a security key $K_{NAS\text{-}MMint}$ from the security key $K_{NAS\_MM}$. The security key $K_{NAS\text{-}MMenc}$ is used for encryption of the MM message. The security key $K_{NAs\text{-}MMint}$ is used for integrity protection processing of the MM message.

The AMF 20 sends the security key $K_{NAS\_SM}$ to the SMF 30. The AMF 20 further sends the security key $K_{UP}$ to the UPF 80. The AMF 20 further sends the security key $K_{AN/NH}$ to the AN 50.

The SMF 30 derives a security key $K_{NAS\text{-}SMenc}$ and a security key $K_{NAS\text{-}SMint}$ from the security key $K_{NAS\_SM}$. The security key $K_{NAS\text{-}SMenc}$ is used for encryption of the SM message. The security key $K_{NAS\text{-}SMint}$ is used for integrity protection processing of the SM message. Alternatively, the AMF 20 may derive the security key $K_{NAS\text{-}SMenc}$ and the security key $K_{NAS\text{-}SMint}$ from the security key $K_{NAS\_SM}$. In this case, the AMF 20 sends the security key $K_{NAS\text{-}SMenc}$ and the security key $K_{NAS\text{-}SMint}$ that have been derived to the SMF 30.

The UPF 80 derives a security key $K_{Sess1enc}$ and a security key $K_{Sess1int}$ from the security key $K_{UP}$. The security key $K_{Sess1enc}$ and the security key $K_{Sess1int}$ are used, for example, in a network slice, which is a network slice 1. Here, the security key $K_{SessNenc}$ and the security key $K_{SessNint}$ are used in the network slice, which is a network slice N (N is an integer equal to or larger than one). The security key $K_{SessNenc}$ is used for encryption of the U-Plane data. The security key $K_{SessNint}$ is used for integrity protection processing of the U-Plane data.

The AN 50 derives a security key $K_{RRCenc}$, a security key $K_{RRCint}$, a security key $K_{UPenc}$, a security key $K_{UPint}$, and a security key $K_{AN\_other}$ from the security key $K_{AN/NH}$. The security key $K_{RRCenc}$, the security key $K_{RRCint}$, the security key $K_{UPenc}$, the security key $K_{UPint}$, and the security key $K_{AN\_other}$ derived from the security key $K_{AN/NH}$ are security keys used in a radio section.

Figure 4:
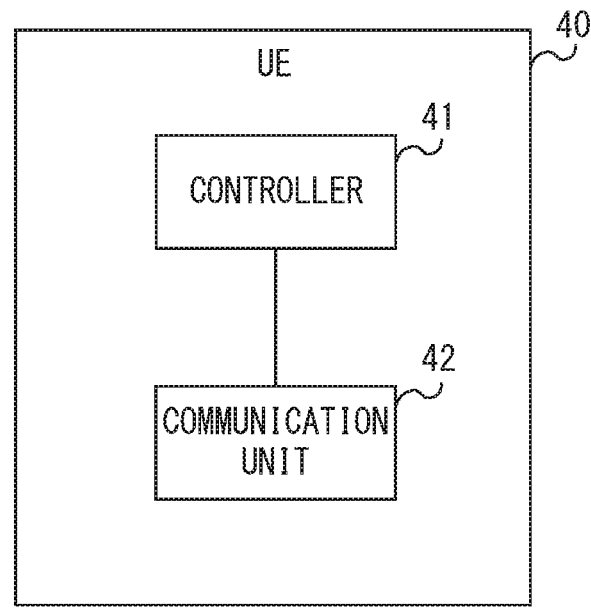
FIG. 4 is a configuration diagram of UE according to the second example embodiment.

With reference next to FIG. 4, a configuration example of the UE 40 according to the second example embodiment will be explained. The UE 40 includes a controller 41 and a communication unit 42. The controller 41 and the communication unit 42 may each be software or a module whose processing is executed by a processor executing a program stored in a memory. Alternatively, the controller 41 and the communication unit 42 may each be hardware such as a circuit or a chip.

The controller 41 derives a security key $K_{3GPP\_AN}$, a security key $K_{non-3GPP\_AN}$, a security key $K_{NAS\_MM}$, a security key $K_{NAS\_SM}$, and a security key $K_{UP}$ from the security key $K_{SEAF}$.

Further, the controller 41 derives a security key $K_{NAS-MMenc}$ and a security key $K_{NAS-MMint}$ from the security key $K_{NAS\_MM}$. Further, the controller 41 derives a security key $K_{NAS-SMenc}$ and a security key $K_{NAS-SMint}$ from the security key $K_{NAS\_SM}$. Further, the controller 41 derives a security key $K_{SessIenc}$, a security key $K_{SessIint}$, a security key $K_{SessNenc}$, and a security key $K_{SessNint}$ from the security key $K_{UP}$.

Further, the controller 41 derives a security key $K_{RRCenc}$, a security key $K_{RRCint}$, a security key $K_{UPenc}$, a security key $K_{UPint}$, and a security key $K_{AN\_other}$ from the security key $K_{AN/NF}$.

The controller 41 applies the security key $K_{NAS-MMenc}$ and the security key $K_{NAS-MMint}$ to the MM message used in the MM processing. Further, the controller 41 applies the security key $K_{NAS-SMenc}$ and the security key $K_{NAS-SMint}$ to the SM message used in the SM processing.

The communication unit 42 sends the MM message to which the security key $K_{NAS-MMenc}$ and the security key $K_{NAS-MMint}$ are applied to the AMF 20. Further, the communication unit 42 sends the SM message to which the security key $K_{NAS-SMenc}$ and the security key $K_{NAS-SMint}$ are applied to the SMF 30 via the AMF 20.

Figure 5:
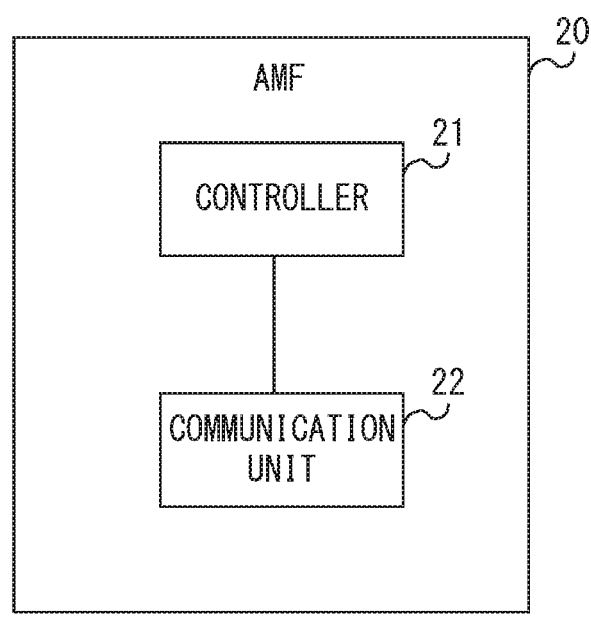
FIG. 5 is a configuration diagram of an AMF entity according to the second example embodiment.

With reference next to FIG. 5, a configuration example of the AMF 20 according to the second example embodiment will be explained. The AMF 20 includes a controller 21 and a communication unit 22. The controller 21 and the communication unit 22 may each be software or a module whose processing is executed by a processor executing a program stored in a memory. Alternatively, the controller 21 and the communication unit 22 may each be hardware such as a circuit or a chip.

The controller 21 derives a security key $K_{NAS\_MM}$, a security key $K_{NAS\_SM}$, and a security key $K_{UP}$ from the security key $K_{SEAF}$. Further, the controller 21 derives a security key $K_{NAS-MMenc}$ and a security key $K_{NAS-MMint}$ from the security key $K_{NAS\_MM}$.

The controller 21 decodes the MM message to which the security key $K_{NAS-MMenc}$ and the security key $K_{NAS-MMint}$ are applied, and extracts the MM message. Further, the controller 21 executes the MM processing using the extracted MM message.

The communication unit 22 forwards the SM message sent from the UE 40 to the SMF 30 and forwards the SM message sent from the SMF 30 to the UE 40. Further, the communication unit 22 sends the security key $K_{NAS\_SM}$ to the SMF 30 and sends the security key $K_{UP}$ to the UPF 80. Further, when the security key $K_{NAS-SMenc}$ and the security key $K_{NAS-SMint}$ have been derived from the security key $K_{NAS\_SM}$ in the controller 21, the communication unit 22 sends the security key $K_{NAS-SMenc}$ and the security key $K_{NAS-SMint}$ to the SMF 30.

Further, the controller 21 may hold the security key $K_{NAS\_SM}$. That is, the controller 21 may share the security key $K_{NAS\_SM}$ used in the SMF 30 with the SMF 30.

Figure 6:
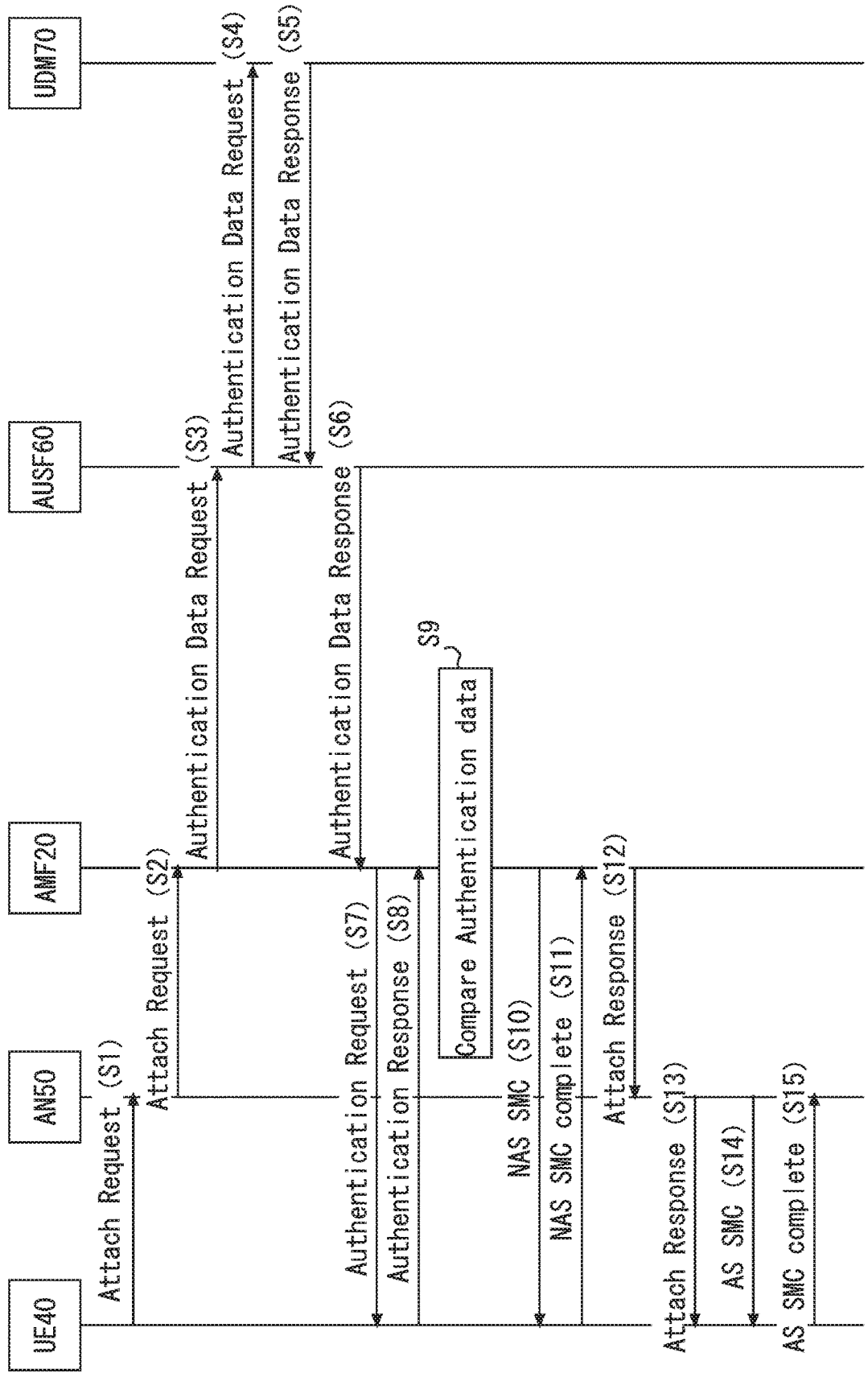
FIG. 6 is a diagram showing a flow of Attach processing according to the second example embodiment.

With reference next to FIG. 6, a flow of Attach processing in the 5G communication system will be explained. First, the UE 40 sends an Attach Request message to the AN 50 (S1). The Attach Request message includes a Configured Network Slice Selection Assistance Information (NSSAI). The NSSAI is, for example, information for identifying a network slice. The Configured NSSAI includes NSSAI indicating at least one network slice where the UE 40 is registered or contracted. The Configured NSSAI may be, for example, a default NSSAI specified first when, for example, the power supply of the UE 40 has made a transition from the OFF state to the ON state.

Next, the AN 50 selects the AMF using the Configured NSSAI and sends the Attach Request message to the selected AMF (S2). In this example, the AN 50 selects the AMF 20 and sends the Attach Request message to the AMF 20. Upon receiving the Attach Request message, the AMF 20 extracts all the accessible SM-NSSAI (Acceptable SM-NSSAI). The SM-NSSAI is used to select the SMF. The SM-NSSAI is information for identifying a network slice that the UE 40 wants to be connected. Further, the AMF 20 generates an Accepted NSSAI and a temp ID, and holds the NSSAI and the temp ID that have been generated. The Accepted NSSAI includes NSSAI indicating at least one network slice to which the UE 40 is allowed to connect.

Next, in the UE 40, the AMF 20, the AUSF 60, and the UDM 70, Authentication and Key Agreement (AKA) processing is executed. A specific procedure of the AKA processing will be explained with reference to Steps S3 to S9 shown below.

By executing the AKA processing, the UE 40 and the AMF 20 are able to hold the same security key $K_{SEAF}$. In the following description, the AKA processing will be explained.

When the AMF 20 does not hold the security key $K_{SEAF}$ regarding the UE 40, the AMF 20 sends an authentication data request message to the AUSF 60 (S3). Next, when the AUSF 60 does not hold the security key $K_{SEAF}$ regarding the UE 40, the AUSF 60 sends the authentication data request message to the UDM 70 (S4).

Next, the UDM 70 sends an authentication data response message including the security key $K_{SEAF}$ to the AUSF 60 (S5). Next, the AUSF 60 sends the authentication data response message including the security key $K_{SEAF}$ to the AMF 20 (S6).

Next, a SEcurity Anchor Function (SEAF) deployed in the AMF 20 generates Authentication Vectors (AVs). The SEAF may be deployed outside the AMF. The AVs include a random number, an authenticating token, and an expected response. The AMF 20 sends an Authentication Request message including the AVs to the UE 40 (S7). The AVs to be sent to the UE 40 include a random number and an authenticating token.

Next, the UE 40 generates a response value in response to the Authentication Request, and sends an Authentication Response message including a response value to the AMF 20 (S8). Further, the UE 40 generates the security key $K_{SEAF}$ using parameters included in the Authentication Request.

The SEAF deployed in the AMF 20 compares the expected response with the response value sent from the UE 40, and executes decision of AKA (S9). The AMF 20 determines that the UE 40 and the AMF 20 hold the same security key $K_{SEAF}$ when the expected response and the response value match each other.

Next, the SCMF deployed in the AMF 20 derives a NAS security key $K_{NAS\_MM}$ from the security key $K_{SEAF}$. The Security Context Management Function (SCMF) may be deployed outside the AMF 20. Further, the AMF 20 sends a NAS Security Mode Command (SMC) to the UE 40 (S10). The NAS SMC includes information regarding NAS security configurations. The NAS security configurations are, for example, an algorithm and an ID of the key regarding integrity protection and encryption.

Next, the UE 40 derives a NAS security key $K_{NAS\_MM}$ from the security key $K_{SEAF}$. The UE 40 sends a NAS SMC complete message to the UE 40 (S11). The UE 40 and the AMF 20 each derive a key regarding integrity protection and encryption from the NAS security key $K_{NAS\_MM}$ using the algorithm sent from the AMF 20 to the UE 40.

Next, the SCMF deployed in the AMF 20 derives an AS security key $K_{AN}$ from the security key $K_{SEAF}$. Further, the AMF 20 sends an Attach Response message to the AN 50 (S12). The Attach Response message includes an AS security key $K_{AN}$, a key ID, an Accepted NSSAI, and a temp ID regarding the UE 40.

Next, the AN 50 sends the Attach Response message to the UE 40 (S13). The Attach Response message includes an Accepted NSSAI and a temp ID.

Next, the AN 50 sends the AS SMC to the UE 40 (S14). The AS SMC includes information regarding the AS security configurations. The AS security configurations are, for example, an algorithm and an ID of the key regarding integrity protection and encryption.

Next, the UE 40 derives an AS security key $K_{AN}$ from the security key $K_{SEAF}$. The UE 40 sends the AS SMC complete message to the AN 50 (S15). The UE 40 and the AN 50 each derive the key regarding integrity protection and encryption from the AS security key $K_{AN}$ using the algorithm sent from the AN 50 to the UE 40.

Figure 7:
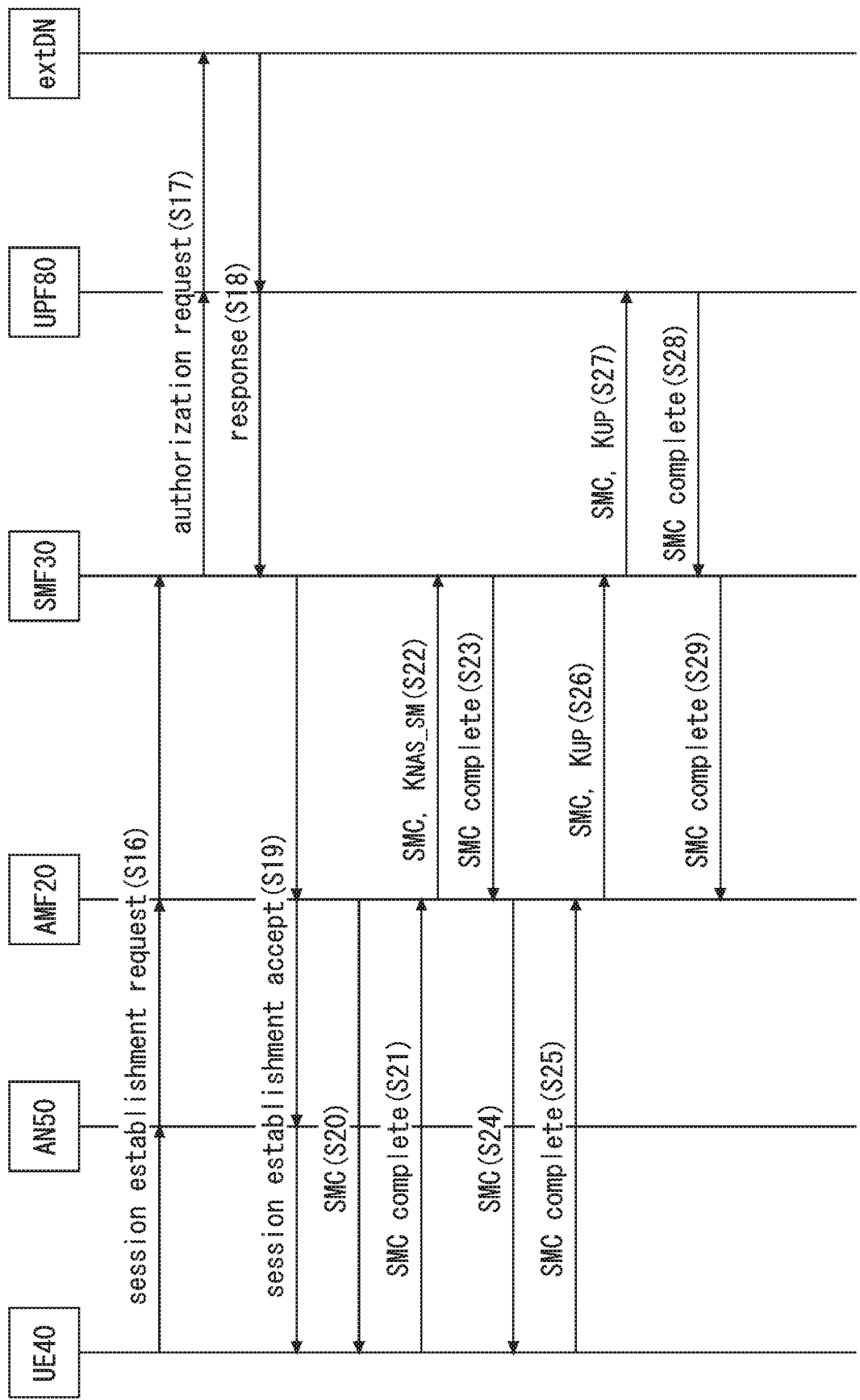
FIG. 7 is a diagram showing a flow of security processing according to the second example embodiment.

With reference next to FIG. 7, a flow of security processing in the session establishment will be explained. First, the UE 40 sends a session establishment request message to the SMF 30 via the AN 50 and the AMF 20 (S16). The session establishment request message includes an SM-NSSAI and a temp ID. The AMF 20 selects the SMF based on the SM-NSSAI and sends the session establishment request message to the selected SMF. In this example, the AMF 20 selects the SMF 30.

Next, the SMF 30 selects a UPF and sends an authorization request message regarding the session establishment to extDN via the selected UPF (S17). In this example, the SMF 30 selects the UPF 80. The extDN corresponds to the DN 110. The extDN is an external network different from the mobile network.

Next, authorization is performed in the extDN, and the extDN sends a response message in response to the authorization request message to the SMF 30 via the UPF 80 (S18).

Next, when the UE 40 has been authenticated in the extDN, the SMF 30 sends a session establishment accept message to the UE 40 via the AMF 20 and the AN 50 (S19).

Next, in the following Steps S20 to S23, security establishment regarding the SM message is executed.

The AMF 20 sends the SMC to the UE 40 (S20). The SMC includes information regarding security configurations for the SM message. The security configurations are, for example, an algorithm and an ID of the key regarding integrity protection and encryption.

Next, the UE 40 derives a security key $K_{NAS\_SM}$ for the SM message from the security key $K_{SEAF}$ using the received algorithm. Alternatively, the UE 40 may derive the security key $K_{NAS\_SM}$ from the security key $K_{NAS\_MM}$. Further, the UE 40 sends an SMC complete message to the AMF 20 (S21).

Next, the AMF 20 derives a security key $K_{NAS\_SM}$ for the SM message from the security key $K_{SEAF}$, similar to the UE 40. Alternatively, the AMF 20 may derive the security key $K_{NAS\_SM}$ from the security key $K_{NAS\_MM}$. Further, the AMF 20 sends the SMC and the security key $K_{NAS\_SM}$ to the SMF 30 (S22). The SMC includes information regarding the security configurations for the SM message. The security configurations are, for example, an algorithm and an ID of the key regarding integrity protection and encryption.

Next, the SMF 30 sends an SMC complete message to the AMF 20 (S23). The UE 40 and the SMF 30 each derive the key regarding integrity protection and encryption from the security key $K_{NAS\_SM}$ using the algorithm sent from the AMF 20 to the UE 40 and the SMF 30.

Next, in the following Steps S24 to S29, security establishment regarding U-plane data is executed.

The AMF 20 sends an SMC to the UE 40 (S24). The SMC includes information regarding the security configurations for the U-Plane data. The security configurations include, for example, an algorithm and an ID of the key regarding integrity protection and encryption.

Next, the UE 40 derives a security key $K_{UP}$ for the U-Plane data from the security key $K_{SEAF}$ using the received algorithm. Alternatively, the UE 40 may derive the security key $K_{UP}$ from the security key $K_{NAS\_SM}$. Further, the UE 40 sends an SMC complete message to the AMF 20 (S25).

Next, the AMF 20 derives a security key $K_{UP}$ for the U-Plane data from the security key $K_{SEAF}$, similar to the UE 40. Alternatively, the AMF 20 may derive the security key $K_{UP}$ from the security key $K_{NAS\_SM}$. Further, the AMF 20 sends the SMC and the security key $K_{UP}$ to the SMF 30 (S26). Alternatively, the AMF 20 may send the SMC to the SMF 30 and the SMF 30 may derive the security key $K_{UP}$ from the security key $K_{NAS\_SM}$. The SMC includes information regarding security configurations for the U-Plane data. The security configurations are, for example, an algorithm and an ID of the key regarding integrity protection and encryption. Next, the SMF 30 sends the received SMC and the security key $K_{UP}$ to the UPF 80 (S27).

Next, the UPF 80 sends an SMC complete message to the SMF 30 (S28). Next, the SMF 30 sends the SMC complete message to the AMF 20 (S29). Here, the UE 40 and the UPF 80 each derive the key regarding integrity protection and encryption from the security key $K_{UP}$ using the algorithm sent from the AMF 20 to the UE 40 and the UPF 80.

As described above, by executing the Attach processing described with reference to FIG. 6 and the security processing described with reference to FIG. 7, the UE 40 and the AMF 20 can share the security key $K_{NAS\_MM}$. Further, the UE 40 and the SMF 30 can share the security key $K_{NAS\_SM}$. Accordingly, the security key $K_{NAS\_MM}$ can be applied to the MM message sent between the UE 40 and the AMF 20. As a result, it becomes possible to apply the security key $K_{NAS\_SM}$ to the SM message sent between the UE 40 and the SMF 30.

Third Example Embodiment

Figure 8:
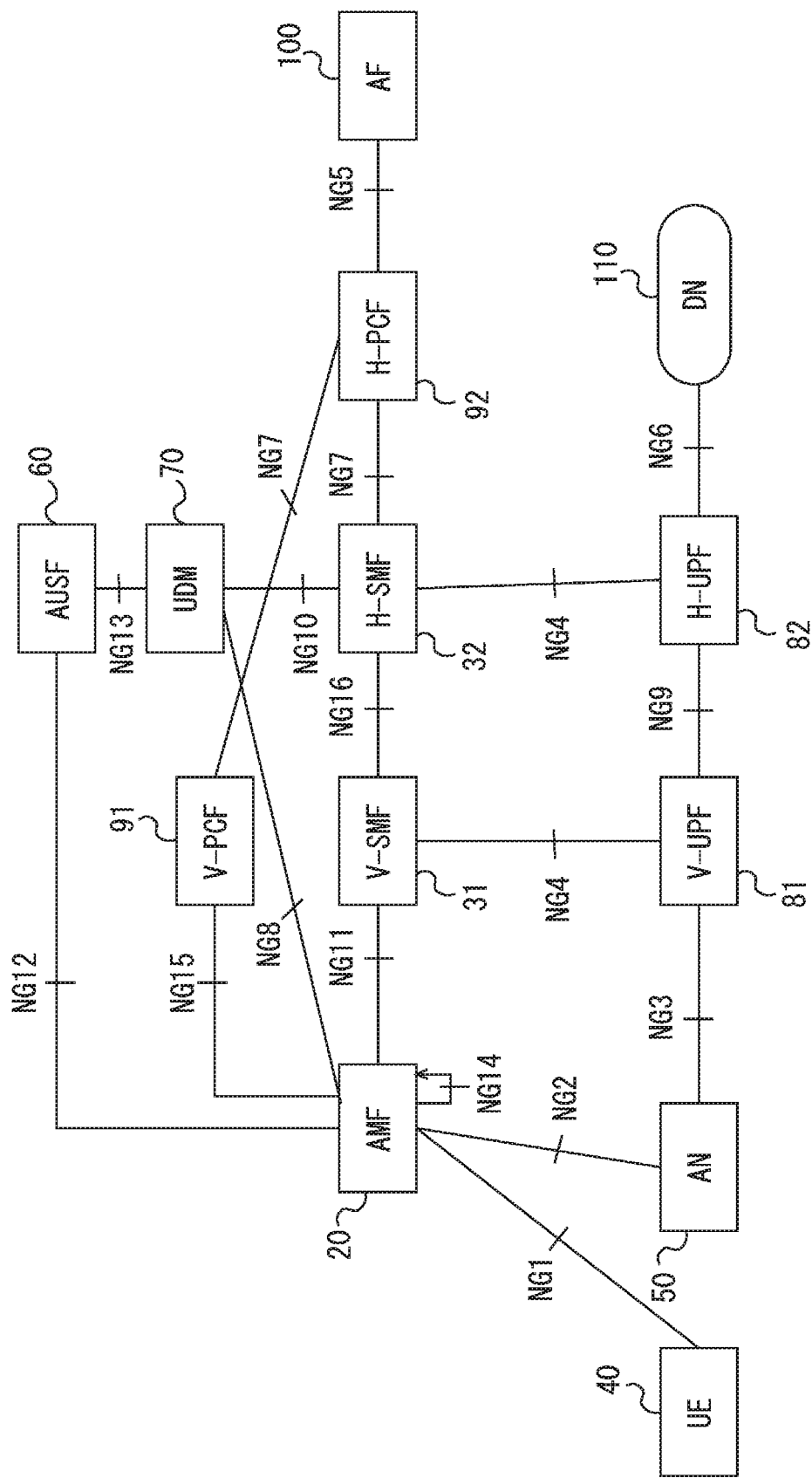
FIG. 8 is a configuration diagram of a communication system according to a third example embodiment.

With reference next to FIG. 8, a configuration example of a communication system according to a third example embodiment will be explained. The communication system shown in FIG. 8 shows a roaming destination network of the UE 40 (hereinafter it will be referred to as a roaming network) and a home network of the UE 40. The roaming network includes an AN 50, an AMF 20, a Visited (V)-SMF 31, a V-UPF 81, and a V-PCF 91. Further, the home network includes Home (H)-SMF 32, an H-UPF 82, an H-PCF 92, a UDM 70, an AUSF 60, and an AF 100.

Figure 9:
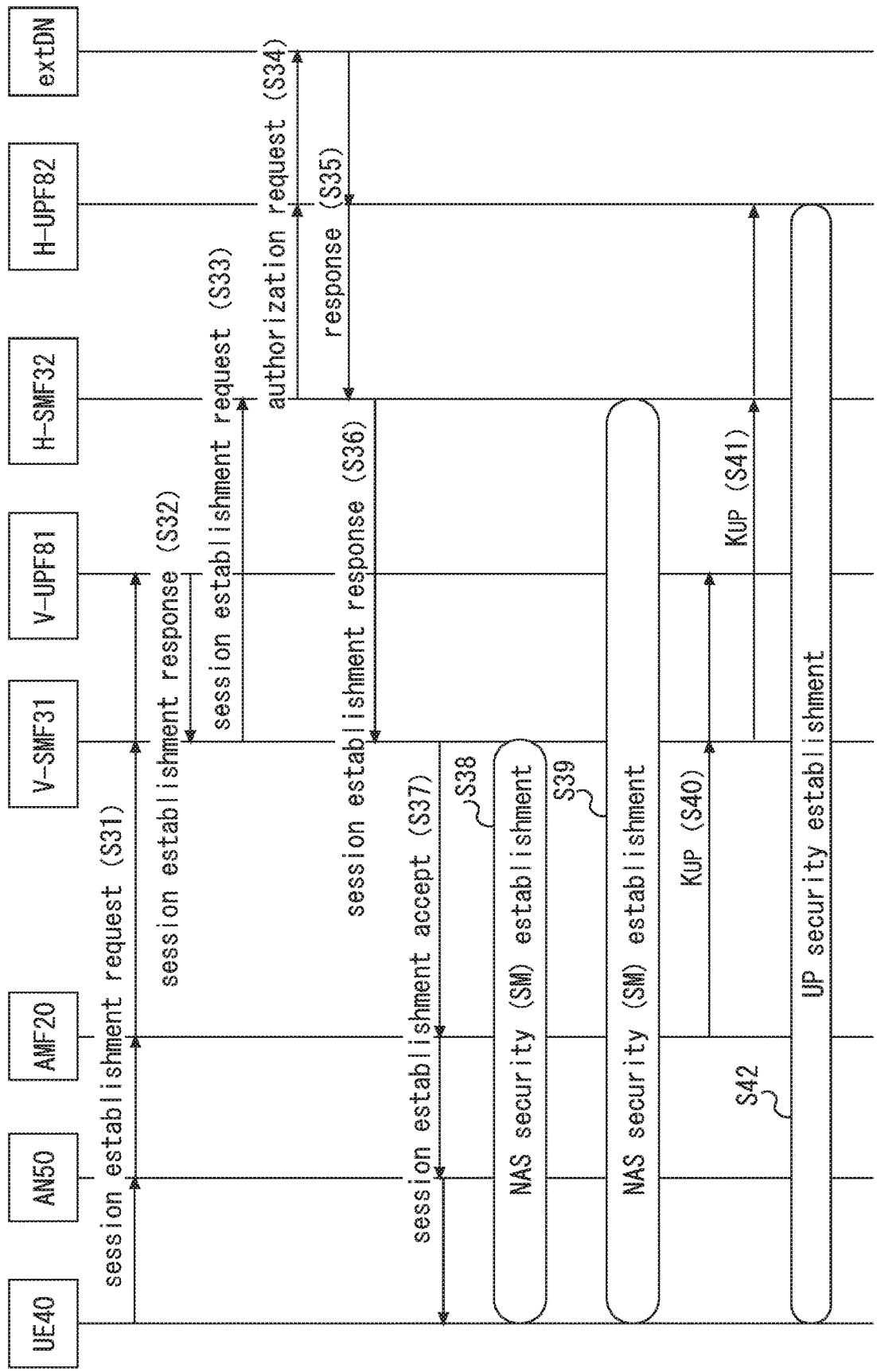
FIG. 9 is a diagram showing a flow of Attach processing according to the third example embodiment.

With reference next to FIG. 9, a flow of security processing in session establishment according to the third example embodiment will be explained. It is assumed that the processing shown in FIG. 6 has already been executed before the processing shown in FIG. 9 is executed. That is, when the UE 40 communicates with the home network via the roaming network, the processing shown in FIG. 6 is executed first. In FIG. 9, it is assumed that a message similar to that shown in FIG. 7 includes parameters similar to those in the message shown in FIG. 6.

After the processing shown in FIG. 6 is executed, the UE 40 sends a session establishment request message to the V-UPF 81 via the AN 50, the AMF 20, and the V-SMF 31 (S31). Next, the V-UPF 81 sends the session establishment response message to the V-SMF 31 (S32). Next, the V-SMF 31 sends the session establishment request message to the H-SMF 32 (S33). Next, the H-SMF 32 sends an authorization request message to the extDN via the H-UPF 82 (S34).

Next, the extDN sends a response message to the H-SMF 32 via the H-UPF 82 as a response message in response to the authorization request message (S35).

Next, the H-SMF 32 sends a session establishment response message to the V-SMF 31 as a response message to the session establishment request message (S36). Next, the V-SMF 31 sends a session establishment accept message to the UE 40 via the AMF 20 and the AN 50 as a response message to the session establishment request message (S37).

Next, in the UE 40 and the V-SMF 31, processing regarding NAS Security (SM) establishment is executed (S38). By executing the processing of Step S38, the UE 40 and the V-SMF 31 are able to hold the same security key $K_{NAS\_SM}$. Further, in the UE 40 and the H-SMF 32, the processing regarding the NAS Security (SM) establishment is executed (S39). By executing the processing of Step S39, the UE 40 and the H-SMF 32 are able to hold the same security key $K_{NAS\_SM}$.

Next, the AMF 20 sends the security key $K_{UP}$ to the V-UPF 81 via the V-SMF 31 (S40). Alternatively, the V-SMF 31 may send the security key $K_{UP}$ to the H-UPF 82 via the H-SMF 32 (S41). Next, in the UE 40, the V-UPF 81, and the H-UPF 82, processing regarding UP security establishment is executed (S42).

As described above, also when the UE 40 has moved to the roaming network, the same can be applied as a case in which the UE 40 resides in the home network. That is, it becomes possible to apply the security key $K_{NAS\_MM}$ to the MM message sent between the UE 40 and the AMF 20. Further, it becomes possible to apply the security key $K_{NAS\_SM}$ to the SM message sent between the UE 40 and the H-SMF 32.

Fourth Example Embodiment

Figure 10:
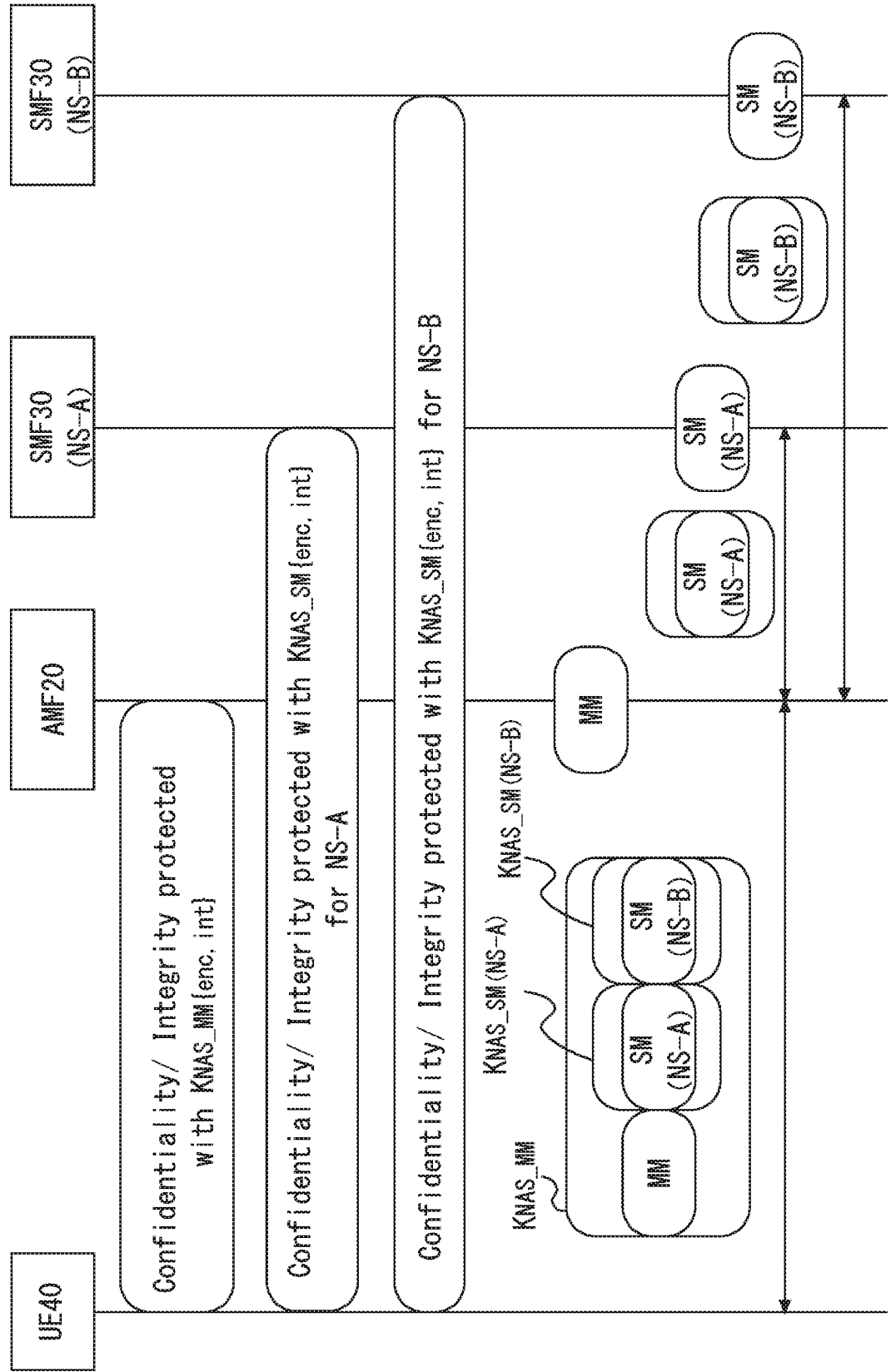
FIG. 10 is a diagram showing a data format of an MM message and an SM message according to a fourth example embodiment.

With reference next to FIG. 10, a data format of the MM message and the SM message according to a fourth example embodiment will be explained. FIG. 10 shows that the core network is divided into a network slice A and a network slice B. Further, the SMF 30 is arranged in each of the network slice A and the network slice B.

Further, the MM message sent between the UE 40 and the AMF 20 is subjected to the encryption and integrity protection processing using the security key $K_{NAS\_MM}$. In other words, the security key $K_{NAS-MMenc}$ and the security key $K_{NAS-MMint}$ are applied to the MM message sent between the UE 40 and the AMF 20.

Further, the SM message sent between the UE 40 and the SMF 30 arranged in the network slice A is subjected to the encryption and integrity protection processing using the security key $K_{NAS\_SM}$ for the network slice A. It is assumed that the security key $K_{NAS\_SM}$ for the network slice A will be referred to as a security key $K_{NAS\_SM}$ (NS-A). In other words, the security key $K_{NAS-SMenc}$ and the security key $K_{NAS-SMint}$ for the network slice A are applied to the SM message sent between the UE 40 and the SMF 30 arranged in the network slice A.

Further, the SM message sent between the UE 40 and the SMF 30 arranged in the network slice B is subjected to the encryption and integrity protection processing using the security key $K_{NAS\_SM}$ for the network slice B. The security key $K_{NAS\_SM}$ for the network slice B will be referred to as a security key $K_{NAS\_SM}$ (NS-B). In other words, the security key $K_{NAS-SMenc}$ and the security key $K_{NAS-SMint}$ for the network slice B are applied to the SM message sent between the UE 40 and the SMF 30 arranged in the network slice B.

With reference to FIG. 10, a case in which the UE 40 sends the MM message and the SM message in one message will be explained. The SM message includes an SM message to be sent to the SMF 30 arranged in the network slice A and an SM message to be sent to the SMF 30 arranged in the network slice B. The SM message to be sent to the SMF 30 arranged in the network slice A will be referred to as an SM message (NS-A). The SM message to be sent to the SMF 30 arranged in the network slice B will be referred to as an SM message (NS-B).

FIG. 10 shows a case in which the SM message (NS-A), the SM message (NS-B), and the MM message are collectively subjected to the encryption and integrity protection processing using the security key $K_{NAS\_MM}$. The SM message (NS-A) is subjected to the encryption and integrity protection processing using the security key $K_{NAS\_SM}$ (NS-A). The SM message (NS-B) is subjected to the encryption and integrity protection processing using the security key $K_{NAS\_SM}$ (NS-B).

Upon receiving the message that has been subjected to the encryption and integrity protection processing using the security key $K_{NAS\_MM}$, the AMF 20 decodes the received message. As a result, the AMF 20 extracts the MM message, the SM message (NS-A), and the SM message (NS-B).

The AMF 20 sends the SM message (NS-A) in which the encryption and integrity protection processing is being performed using the security key $K_{NAS\_SM}$ (NS-A) to the SMF 30 arranged in the network slice A. Further, the AMF 20 sends the SM message (NS-B) in which the encryption and integrity protection processing is being performed using the security key $K_{NAS\_SM}$ (NS-B) to the SMF 30 arranged in the network slice B.

The SMF 30 arranged in the network slice A and the SMF 30 arranged in the network slice B each decode the received message and extract an SM message (NS-A) and an SM message (B).

Figure 11:
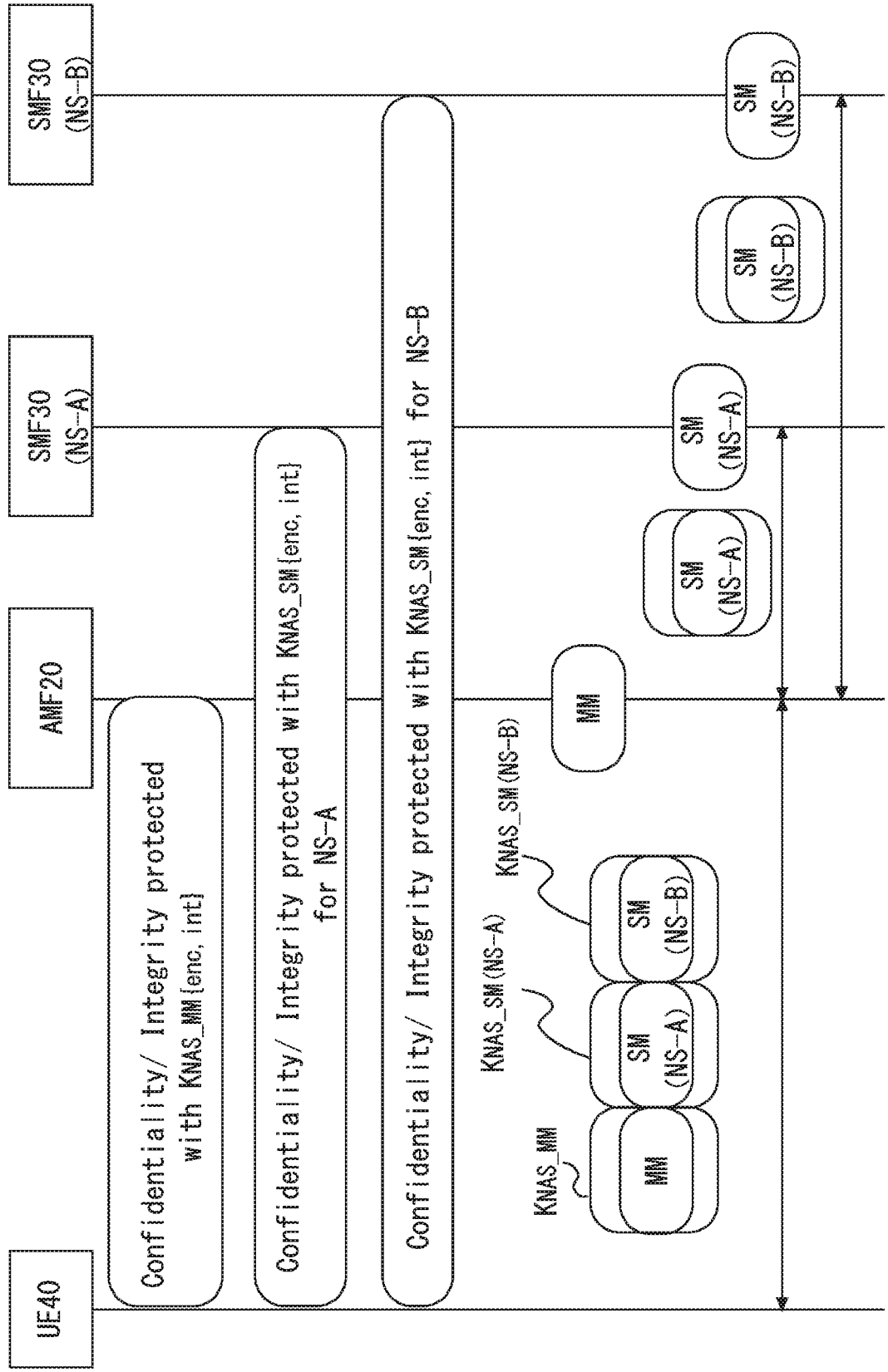
FIG. 11 is a diagram showing a data format of the MM message and the SM message according to the fourth example embodiment.

With reference next to FIG. 11, a data format of the MM message and the SM message different from that shown in FIG. 10 will be explained. FIG. 11 also shows that the UE 40 sends the MM message, the SM message (NS-A), and the SM message (NS-B) in one message, similar to the case shown in FIG. 10. Further, in FIG. 11 as well, the SM message (NS-A) is subjected to the encryption and integrity protection processing using the security key $K_{NAS\_SM}$ (NS-A), similar to the case shown in FIG. 10. Further, the SM message (NS-B) is subjected to the encryption and integrity protection processing using the security key $K_{NAS\_SM}$ (NS-B).

However, in FIG. 11, unlike the case shown in FIG. 10, only the MM message is subjected to the encryption and integrity protection processing using the security key $K_{NAS\_MM}$.

Upon receiving the SM message (NS-A) and the SM message (NS-B), the AMF 20 decodes the received MM message. As a result, the AMF 20 extracts the MM message. The MM message is subjected to the encryption and integrity protection processing using the security key $K_{NAS\_MM}$. The SM message (NS-A) is subjected to the encryption and integrity protection processing using the MM message and the security key $K_{NAS\_SM}$ (NS-A). The SM message (NS-B) is subjected to the encryption and integrity protection processing using the security key $K_{NAS\_SM}$ (NS-B).

The AMF 20 sends the SM message (NS-A) in which the encryption and integrity protection processing is being performed using the security key $K_{NAS\_SM}$ (NS-A) to the SMF 30 arranged in the network slice A. Further, the AMF 20 sends the SM message (NS-B) in which the encryption and integrity protection processing is being performed using the security key $K_{NAS\_SM}$ (NS-B) to the SMF 30 arranged in the network slice B.

The SMF 30 arranged in the network slice A and the SMF 30 arranged in the network slice B each decode the received message and extract the SM message (NS-A) and the SM message (B).

Figure 12:
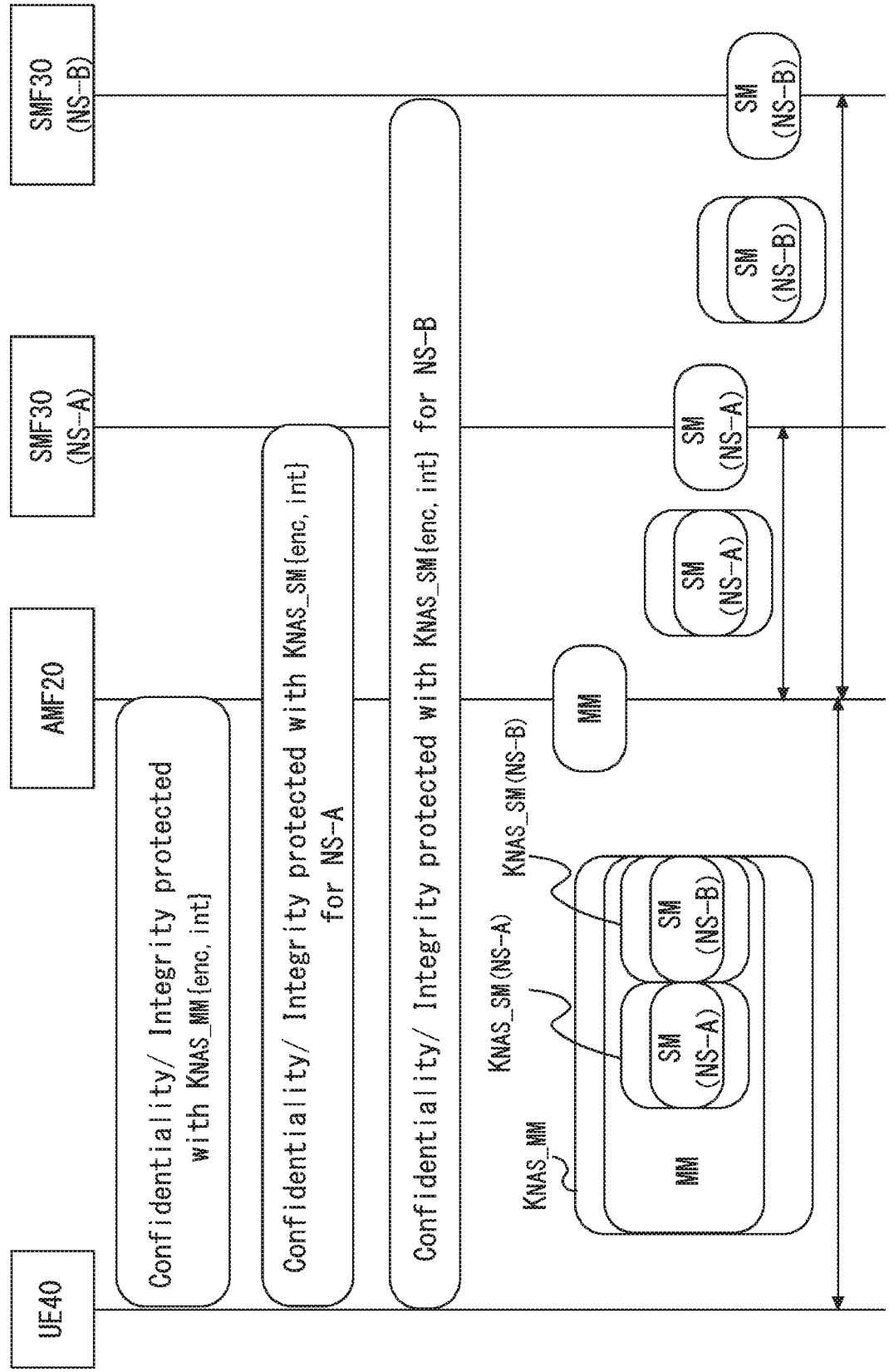
FIG. 12 is a diagram showing a data format of the MM message and the SM message according to the fourth example embodiment.

With reference next to FIG. 12, a data format of the MM message and the SM message different from those shown in FIGS. 10 and 11 will be explained. In FIG. 12, the SM message (NS-A) is subjected to the encryption and integrity protection processing using the security key $K_{NAS\_SM}$ (NS-A), similar to the case shown in FIG. 10. Further, the SM message (NS-B) is subjected to the encryption and integrity protection processing using the security key $K_{NAS\_SM}$ (NS-B).

However, FIG. 12 shows that the SM message (NS-A) and the SM message (NS-B) are a part of the MM message. The SM message (NS-A) and the SM message (NS-B) may be configured in a payload part of the MM message.

Upon receiving the MM message in which the encryption and integrity protection processing is performed using the security key $K_{NAS\_MM}$, the AMF 20 decodes the received MM message. Further, the AMF 20 separates the SM message (NS-A) and the SM message (NS-B) from the MM message. As a result, the AMF 20 extracts the MM message.

The AMF 20 sends the SM message (NS-A) in which the encryption and integrity protection processing is being performed using the security key $K_{NAS\_SM}$ (NS-A) to the SMF 30 arranged in the network slice A. Further, the AMF 20 sends the SM message (NS-B) in which the encryption and integrity protection processing is being performed using the security key $K_{NAS\_SM}$ (NS-B) to the SMF 30 arranged in the network slice B.

The SMF 30 arranged in the network slice A and the SMF 30 arranged in the network slice B each decode the received message and extract the SM message (NS-A) and the SM message (NS-B).

As described above, in some cases, the MM message and at least one SM message are sent in one message. In this case, encryption and integrity protection processing may be performed using the security key $K_{NAS\_SM}$ (NS-A) to be applied to the MM message and the security key $K_{NAS\_SM}$ to be applied to the SM message.

Fifth Example Embodiment

Figure 13:
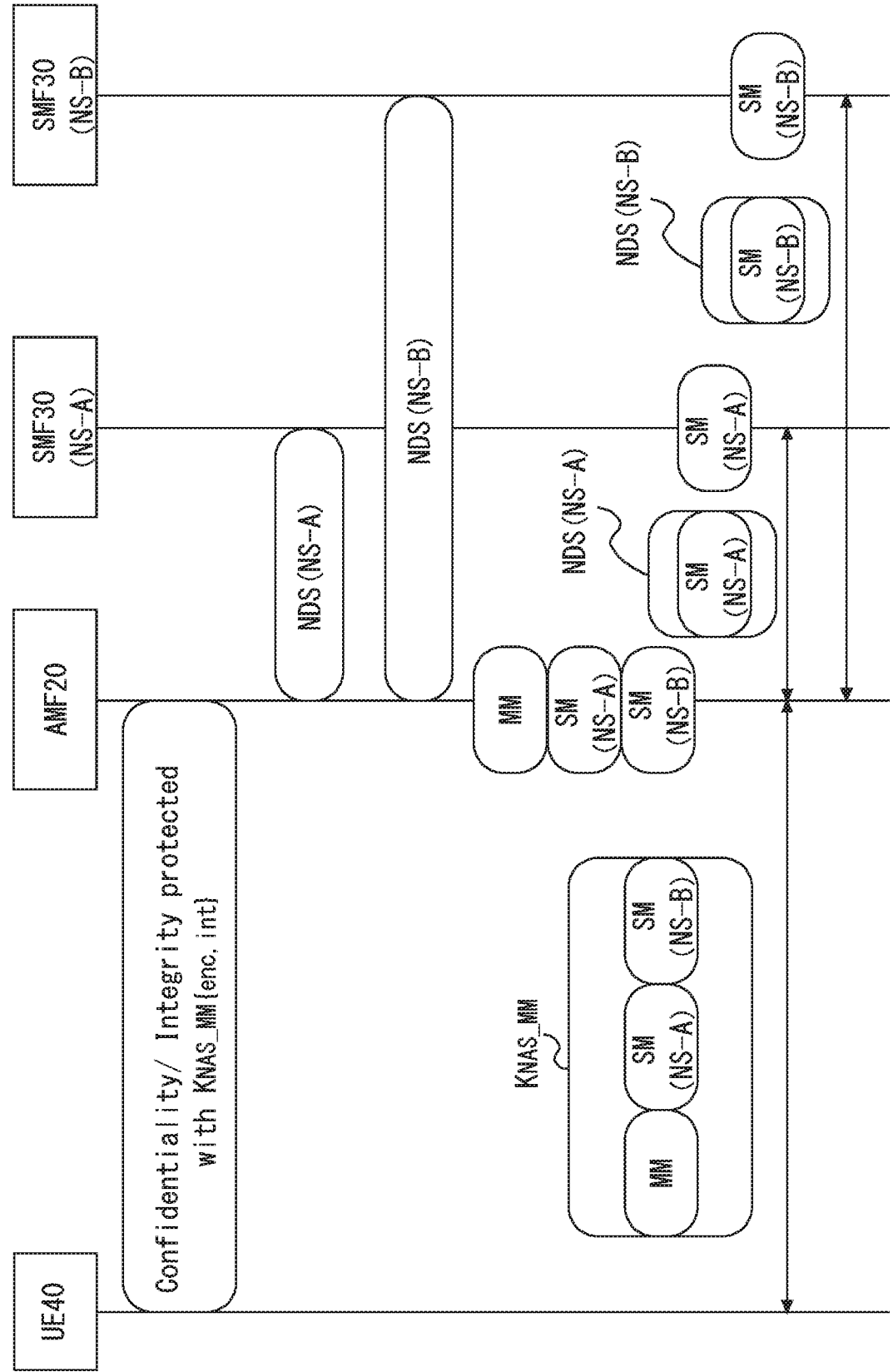
FIG. 13 is a diagram showing a data format of an MM message and an SM message according to a fifth example embodiment.

With reference next to FIG. 13, a data format of the MM message and the SM message according to a fifth example embodiment will be explained. FIG. 13 shows a case in which the core network is divided into the network slice A and the network slice B, similar to the case shown in FIG. 10. Further, the SMF 30 is arranged in each of the network slice A and the network slice B.

Further, the message sent between the UE 40 and the AMF 20 is subjected to the encryption and integrity protection processing using the security key $K_{NAS\_MM}$. In other words, the security key $K_{NAS-MMenc}$ and the security key $K_{NAS-MMint}$ are applied to the message sent between the UE 40 and the AMF 20.

A Network Domain Security (NDS) is applied between the AMF 20 and the SMF 30 arranged in the network slice A and between the AMF 20 and the SMF 30 arranged in the network slice B. The NDS is security applied between the AMF 20 and the SMF 30. For example, security of the NDS between the AMF 20 and the SMF 30 is ensured using, for example, IPsec. When the NDS is used between the AMF 20 and the SMF 30, a security key $K_{NDS}$ may be shared in advance between the AMF 20 and the SMF 30.

With reference to FIG. 13, a case in which the UE 40 sends the MM message, the SM message (NS-A), and the SM message (NS-B) in one message will be explained.

FIG. 13 shows a case in which the SM message (NS-A), the SM message (NS-B), and the MM message are collectively subjected to the encryption and integrity protection processing using the security key $K_{NAS\_MM}$.

Upon receiving the message that has been subjected to the encryption and integrity protection processing using the security key $K_{NAS\_MM}$, the AMF 20 decodes the received message. As a result, the AMF 20 extracts the MM message, the SM message (NS-A), and the SM message (NS-B).

The AMF 20 sends, to the SMF 30 arranged in the network slice A, an SM message (NS-A) to which NDS for the network slice A has been applied. Applying the NDS for the network slice A may be, for example, applying the security key $K_{NDS}$ used in IPsec configured between the AMF 20 and the SMF 30 arranged in the network slice A.

Further, the AMF 20 sends, to the SMF 30 arranged in the network slice B, the SM message (NS-B) to which the NDS for the network slice B is applied.

The SMF 30 arranged in the network slice A and the SMF 30 arranged in the network slice B each decode the received message and extract the SM message (NS-A) and the SM message (B).

The NDS may be applied between the AMF 20 and the SMF 30 arranged in the network slice A, similar to the case shown in FIG. 13. Further, the security key $K_{NAS\_SM}$ (NS-B) may be applied between the UE 40 and the SMF 30 arranged in the network slice B, similar to the cases shown in FIGS. 10 to 12. A case in which different security is applied to the SM message to be sent to the network slice A and the SM message to be sent to the network slice B will be explained. In this case, for example, the security key $K_{NAS\_MM}$ may be collectively applied to the SM message (NS-A), the MM message, and the SM message (NS-B) to which the security key $K_{NAS\_SM}$ (NS-B) has been applied.

Further, the MM message and the SM message (NS-A) may be subjected to the encryption and integrity protection processing using the security key $K_{NAS\_MM}$ between the UE 40 and the AMF 20. Further, the SM message (NS-B) may be subjected to the encryption and integrity protection processing using the security key $K_{NAS\_SM}$ (NS-B).

Further, between the UE 40 and the AMF 20, the SM message (NS-A), and the SM message (NS-B) in which the encryption and integrity protection processing is being performed using the security key $K_{NAS\_SM}$ (NS-B) may be a part of the MM message.

As described above, the NDS is applied between the AMF 20 and the SMF 30, whereby different security can be applied to the MM message and the SM message.

Sixth Example Embodiment

Figure 14:
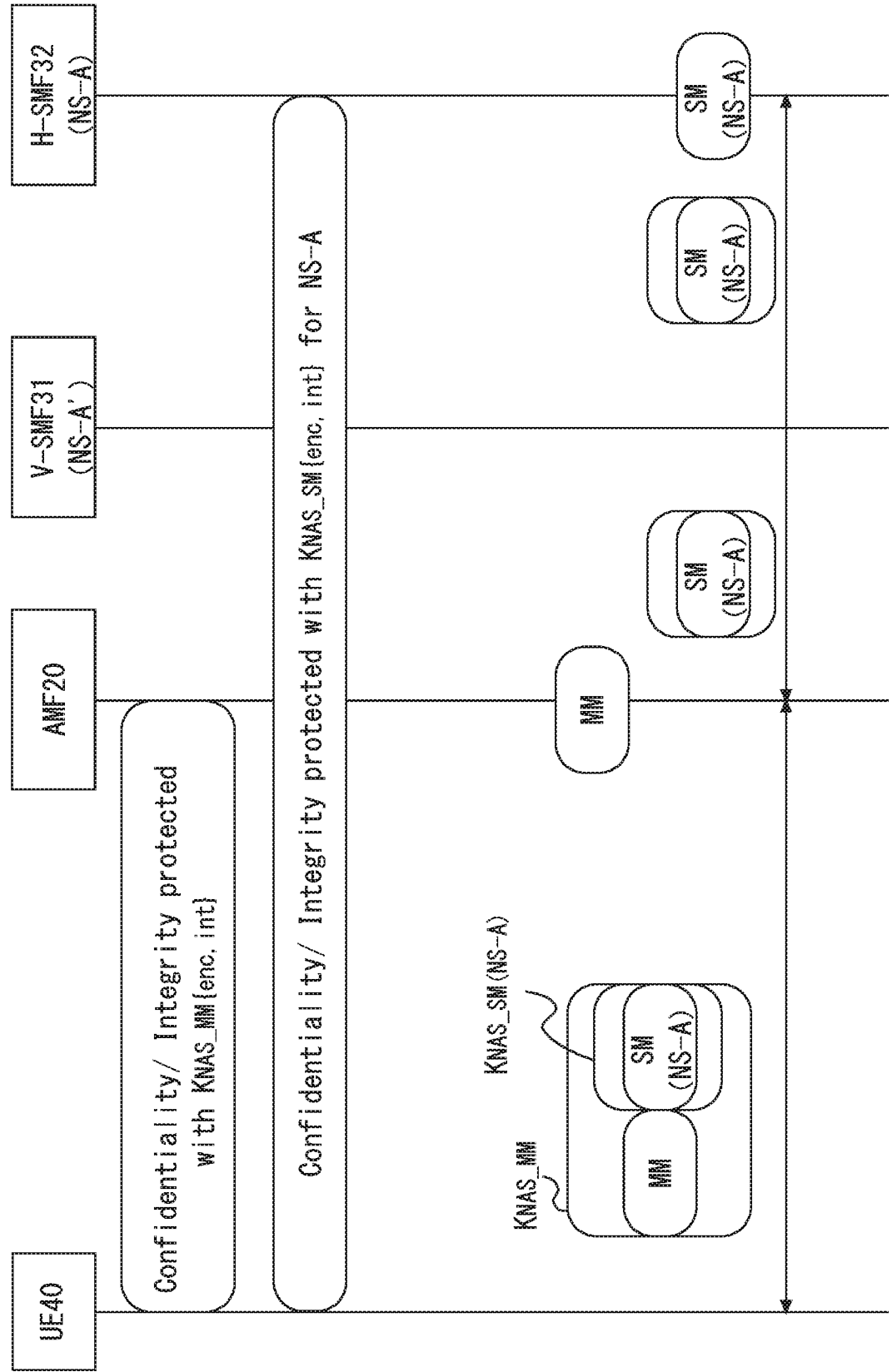
FIG. 14 is a diagram showing a data format of an MM message and an SM message according to a sixth example embodiment.

With reference next to FIG. 14, a data format of the MM message and the SM message according to a sixth example embodiment will be explained. FIG. 14 shows that the UE 40 communicates with the home network via the roaming network. Further, the UE 40 communicates with the network slice A of the home network via a network slice A' of the roaming network. The V-SMF 31 is arranged in the network slice A' and the H-SMF 32 is arranged in the network slice A. The network slice A' is used as the network slice associated with the network slice A.

The MM message sent between the UE 40 and the AMF 20 arranged in the roaming network is subjected to the encryption and integrity protection processing using the security key $K_{NAS\_MM}$. In other words, the security key $K_{NAS\text{-}MMenc}$ and the security key $K_{NAS\text{-}MMint}$ are applied to the MM message sent between the UE 40 and the AMF 20.

Further, the SM message sent between the UE 40 and the H-SMF 32 is subjected to the encryption and integrity protection processing using the security key $K_{NAS\_SM}$ (NS-A) for the network slice A in the home network. In other words, the security key $K_{NAS\text{-}SMenc}$ and the security key $K_{NAS\text{-}SMint}$ for the network slice A are applied to the MM message sent between the UE 40 and the AMF 20.

With reference now to FIG. 14, a case in which the UE 40 sends the MM message and the SM message (NS-A) to be sent to the H-SMF 32 arranged in the network slice A of the home network in one message will be explained.

FIG. 14 shows a case in which the SM message (NS-A) and the MM message are collectively subjected to the encryption and integrity protection processing using the security key $K_{NAS\_MM}$. The SM message (NS-A) is subjected to the encryption and integrity protection processing using the security key $K_{NAS\_SM}$ (NS-A).

Upon receiving the message that has been subjected to the encryption and integrity protection processing using the security key $K_{NAS\_MM}$, the AMF 20 decodes the received message. As a result, the AMF 20 extracts the MM message, and the SM message (NS-A) in which the encryption and integrity protection processing is being performed using the security key $K_{NAS\_SM}$ (NS-A).

The AMF 20 sends the SM message (NS-A) in which the encryption and integrity protection processing is being performed using the security key $K_{NAS\_SM}$ (NS-A) to the H-SMF 32 via the V-SMF 31.

The H-SMF 32 decodes the received message and extracts the SM message (NS-A).

Figure 15:
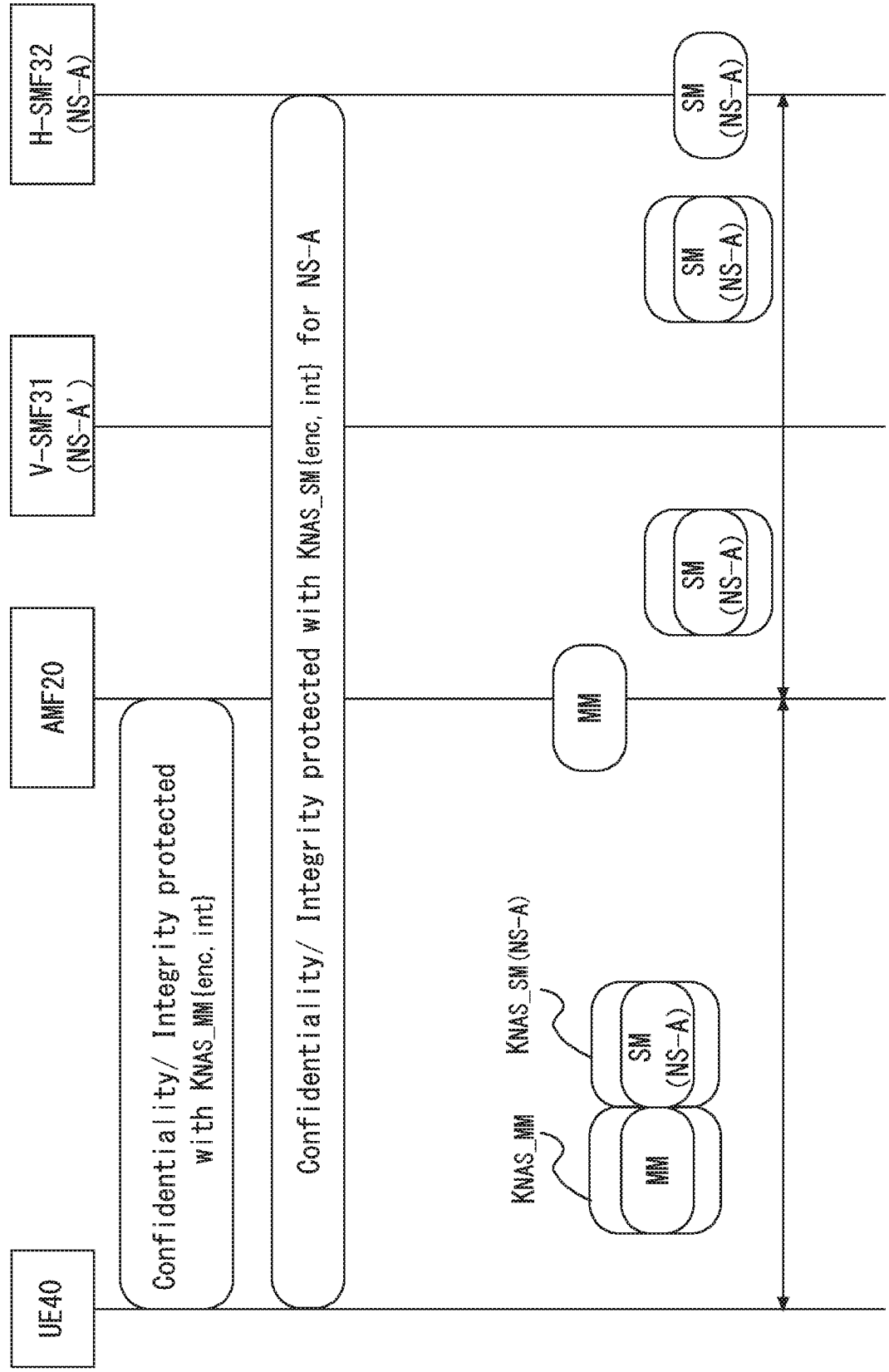
FIG. 15 is a diagram showing a data format of the MM message and the SM message according to the sixth example embodiment.

With reference next to FIG. 15, a data format of the MM message and the SM message different from that shown in FIG. 14 will be explained. FIG. 15 also shows that the UE 40 sends the MM message and the SM message (NS-A) in one message, similar to the case shown in FIG. 14. Further, in FIG. 15 as well, similar to the case shown in FIG. 14, the SM message (NS-A) is subjected to the encryption and integrity protection processing using the security key $K_{NAS\_SM}$ (NS-A).

However, in FIG. 15, unlike the case shown in FIG. 14, only the MM message is subjected to the encryption and integrity protection processing using the security key $K_{NAS\_MM}$.

Upon receiving the MM message and the SM message (NS-A), the AMF 20 decodes the received MM message. The MM message is subjected to the encryption and integrity protection processing using the security key $K_{NAS\_MM}$. The SM message (NS-A) is subjected to the encryption and integrity protection processing using the security key $K_{NAS\_SM}$ (NS-A). As a result, the AMF 20 extracts the MM message.

The AMF 20 sends the SM message (NS-A) in which the encryption and integrity protection processing is being performed using the security key $K_{NAS\_SM}$ (NS-A) to the H-SMF 32 via the V-SMF 31.

The H-SMF 32 decodes the received message and extracts the SM message (NS-A).

Figure 16:
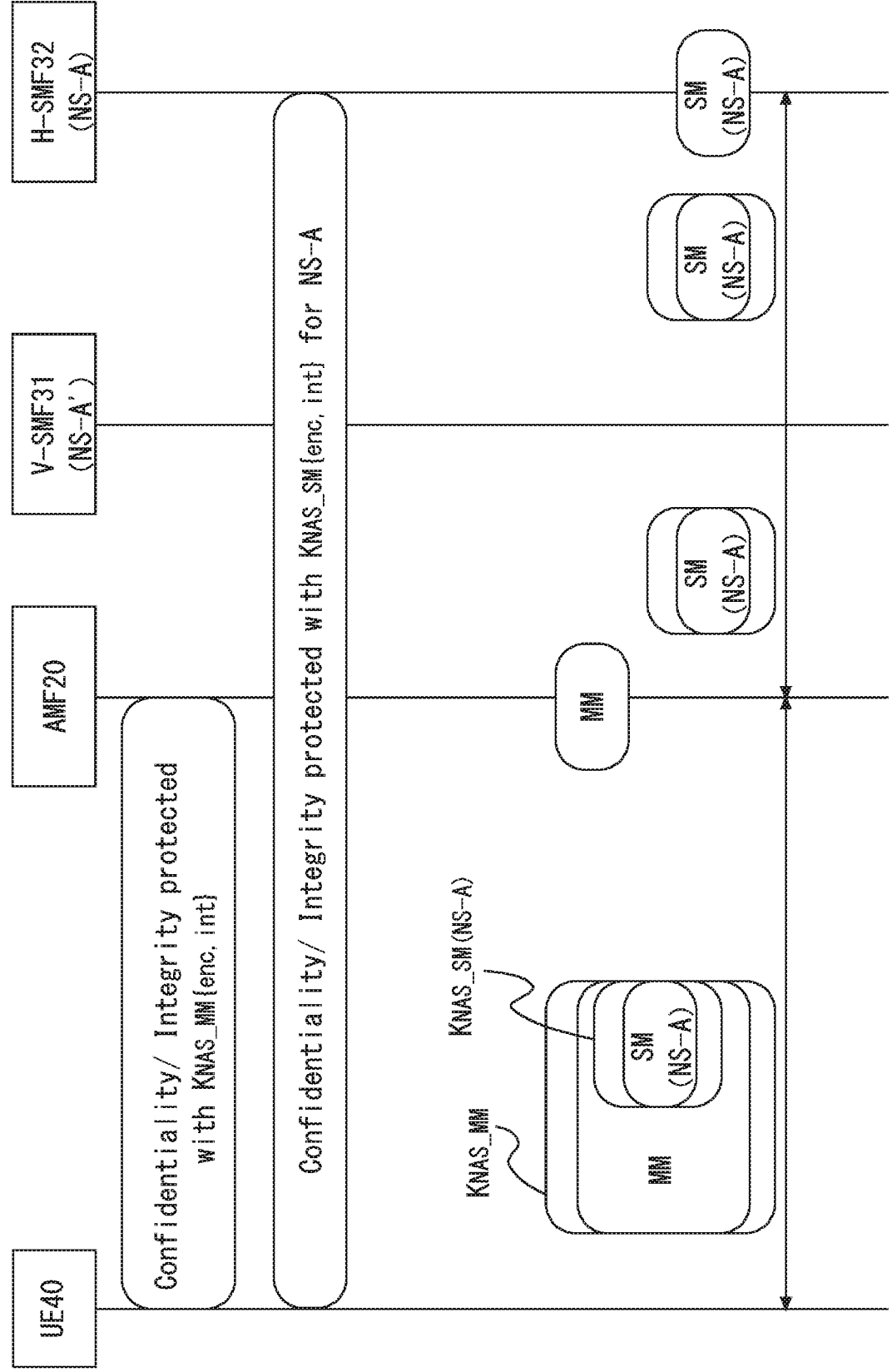
FIG. 16 is a diagram showing a data format of the MM message and the SM message according to the sixth example embodiment.

With reference next to FIG. 16, a data format of the MM message and the SM message different from those shown in FIGS. 14 and 15 will be explained. In FIG. 16, similar to the case shown in FIG. 14, the SM message (NS-A) is subjected to the encryption and integrity protection processing using the security key $K_{NAS\_SM}$ (NS-A).

However, FIG. 16 shows that the SM message (NS-A) in which the encryption and integrity protection processing is being performed using the security key $K_{NAS\_SM}$ (NS-A) is a part of the MM message.

Upon receiving the MM message in which the encryption and integrity protection processing is being performed using the security key $K_{NAS\_MM}$, the AMF 20 decodes the received MM message. Further, the AMF 20 separates the SM message (NS-A) in which the encryption and integrity protection processing is being performed using the security key $K_{NAS\_SM}$ (NS-A) from the MM message. As a result, the AMF 20 extracts the MM message.

The AMF 20 forwards the SM message (NS-A) in which the encryption and integrity protection processing is being performed using the security key $K_{NAS\_SM}$ (NS-A) to the H-SMF 32 via the V-SMF 31.

The H-SMF 32 decodes the received message and extracts the SM message (NS-A).

As described above, in some cases, the MM message and at least one SM message are sent as one message via the roaming network. Even in this case, encryption and integrity protection processing can be performed using the security key $K_{NAS\_SM}$ (NS-A) and the security key $K_{NAS\_SM}$. The security key $K_{NAS\_SM}$ (NS-A) is applied to the MM message. The security key $K_{NAS\_SM}$ is applied to the SM message.

Seventh Example Embodiment

Figure 17:
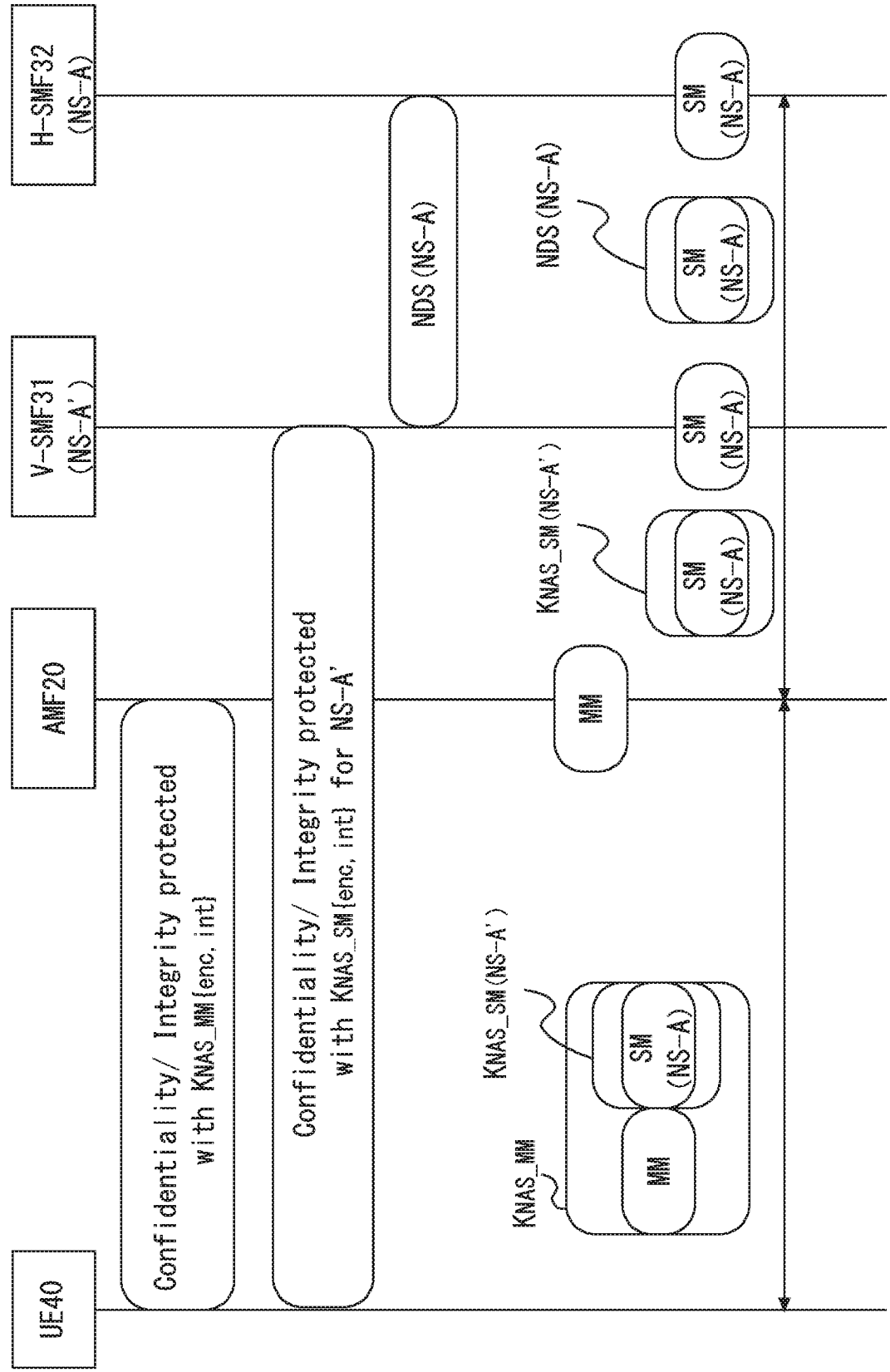
FIG. 17 is a diagram showing a data format of an MM message and an SM message according to a seventh example embodiment.

With reference next to FIG. 17, a data format of the MM message and the SM message according to a seventh example embodiment will be explained. FIG. 17 shows that the UE 40 communicates with the home network via the roaming network, similar to the case shown in FIG. 14.

Further, the message sent between the UE 40 and the AMF 20 is subjected to the encryption and integrity protection processing using the security key $K_{NAS\_MM}$. In other words, the security key $K_{NAS\text{-}MMenc}$ and the security key $K_{NAS\text{-}MMint}$ are applied to the message sent between the UE 40 and the AMF 20.

The message sent between the UE 40 and the V-SMF 31 is subjected to the encryption and integrity protection processing using the security key $K_{NAS\_SM}$ (NS-A').

A Network Domain Security (NDS) is applied between the V-SMF 31 arranged in the roaming network and the H-SMF 32 arranged in the home network. When the NDS is used between the V-SMF 31 and the H-SMF 32, the security key $K_{NDS}$ may be shared between the V-SMF 31 and the H-SMF 32 in advance.

Now, with reference to FIG. 17, a case in which the UE 40 sends the MM message and the SM message (NS-A) in one message will be explained.

FIG. 17 shows a case in which the SM message (NS-A) to which the security key $K_{NAS\_SM}$ (NS-A') is applied and the MM message are collectively subjected to the encryption and integrity protection processing using the security key $K_{NAS\_MM}$.

Upon receiving the message that has been subjected to the encryption and integrity protection processing using the security key $K_{NAS\_MM}$, the AMF 20 decodes the received message. As a result, the AMF 20 extracts the MM message, and the SM message (NS-A) to which the security key $K_{NAS\_SM}$ (NS-A') is applied.

The AMF 20 sends, to the V-SMF 31, the SM message (NS-A) to which the security key $K_{NAS\_SM}$ (NS-A') is applied. Upon receiving the SM message (NS-A) to which the security key $K_{NAS\_SM}$ (NS-A') is applied, the V-SMF 31 decodes the received message. As a result, the V-SMF 31 extracts the SM message (NS-A).

The V-SMF 31 sends an SM message (NS-A) to which NDS for the network slice A has been applied to the H-SMF 32 that is arranged in the network slice A of the home network.

The H-SMF 32 decodes the received message and extracts the SM message (NS-A).

Further, the message that the UE 40 sends to the AMF 20 may have a format other than the one shown in FIG. 17. This message may have formats shown in FIGS. 15 and 16.

Figure 18:
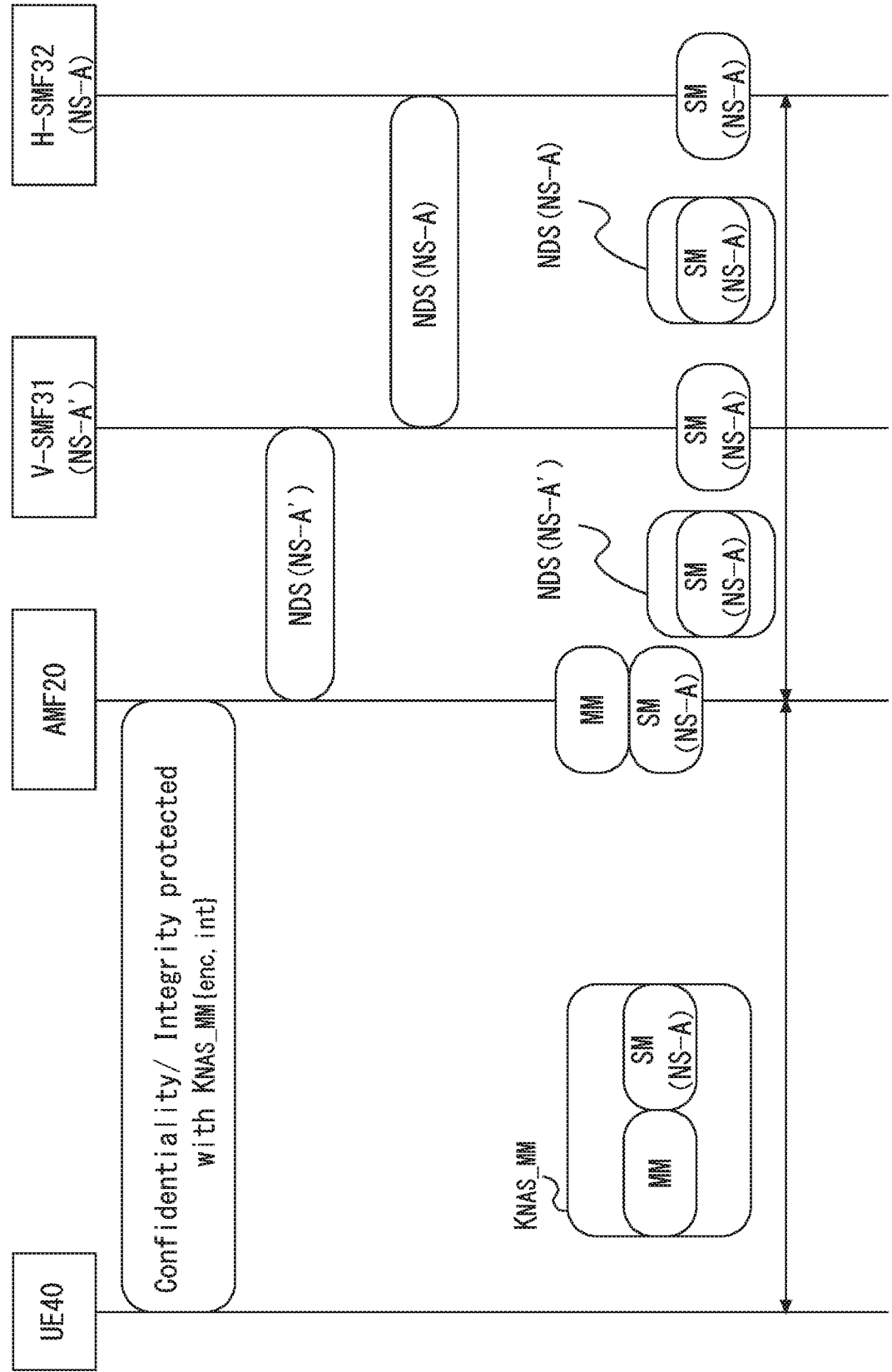
FIG. 18 is a diagram showing a data format of the MM message and the SM message according to the seventh example embodiment.

With reference next to FIG. 18, a data format of the MM message and the SM message different from that shown in FIG. 17 will be explained. FIG. 18 is different from FIG. 17 in that NDS is used between the AMF 20 and the V-SMF 31. FIG. 18 is different from FIG. 17 also in that the security key $K_{NAS\_SM}$ (NS-A') is not applied between the UE 40 and the V-SMF 31.

FIG. 18 indicates that the SM message (NS-A) and the MM message are collectively subjected to the encryption and integrity protection processing using the security key $K_{NAS\_MM}$.

Upon receiving the message that has been subjected to the encryption and integrity protection processing using the security key $K_{NAS\_MM}$, the AMF 20 decodes the received message. As a result, the AMF 20 extracts the MM message and the SM message (NS-A).

The AMF 20 sends, to the V-SMF 31 arranged in the network slice A', an SM message (NS-A) to which NDS for the network slice A' has been applied.

The V-SMF 31 decodes the SM message (NS-A) to which NDS for the network slice A' is applied, and extracts the SM message (NS-A). After that, the V-SMF 31 sends, to the H-SMF 32 that is arranged in the network slice A, an SM message (NS-A) to which NDS for the network slice A has been applied.

The H-SMF 32 decodes the received message and extracts the SM message (NS-A).

Further, the message that the UE 40 sends to the AMF 20 may not have the format shown in FIG. 17. For example, the SM message (NS-A) may be a part of the MM message.

As described above, the NDS is applied to at least one of a part between the AMF 20 and the V-SMF 31 and a part between the V-SMF 31 and the H-SMF 32, whereby different security can be applied to the MM message and the SM message.

Further, in each of the aforementioned example embodiments, the security key held by the SMF 30 may be deleted when, for example, the UE has been detached. Further, the security keys held by the UE 40 and the SMF 30 may be updated based on the request from the UE 40 or the AMF 20. The AMF 20 may send, for example, a random number to the UE 40 and the SMF 30, and the UE 40 and the SMF 30 may update the security using the received random number.

Eighth Example Embodiment

Figure 19:
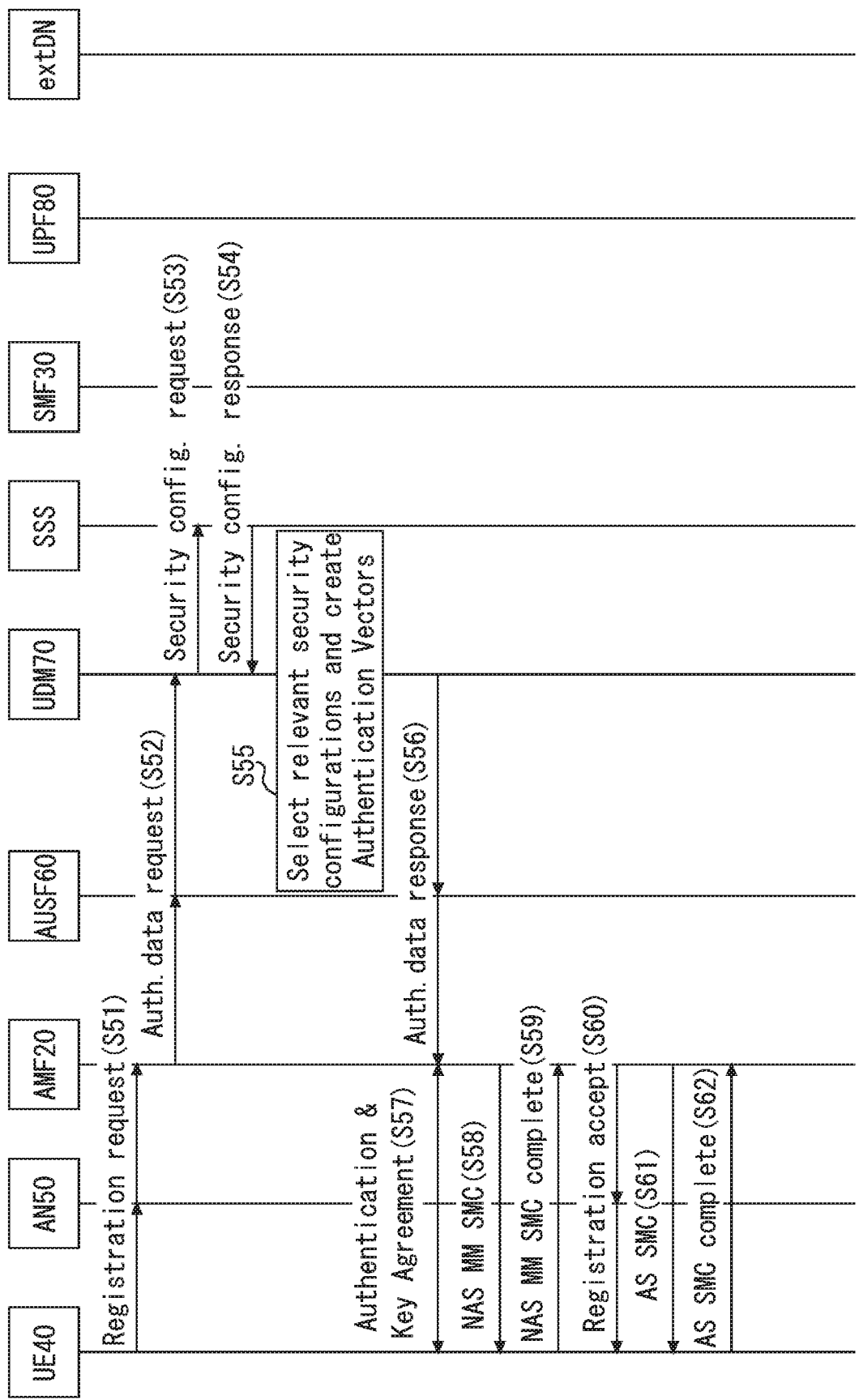
FIG. 19 is a diagram showing a flow of security processing according to an eighth example embodiment.
Figure 20:
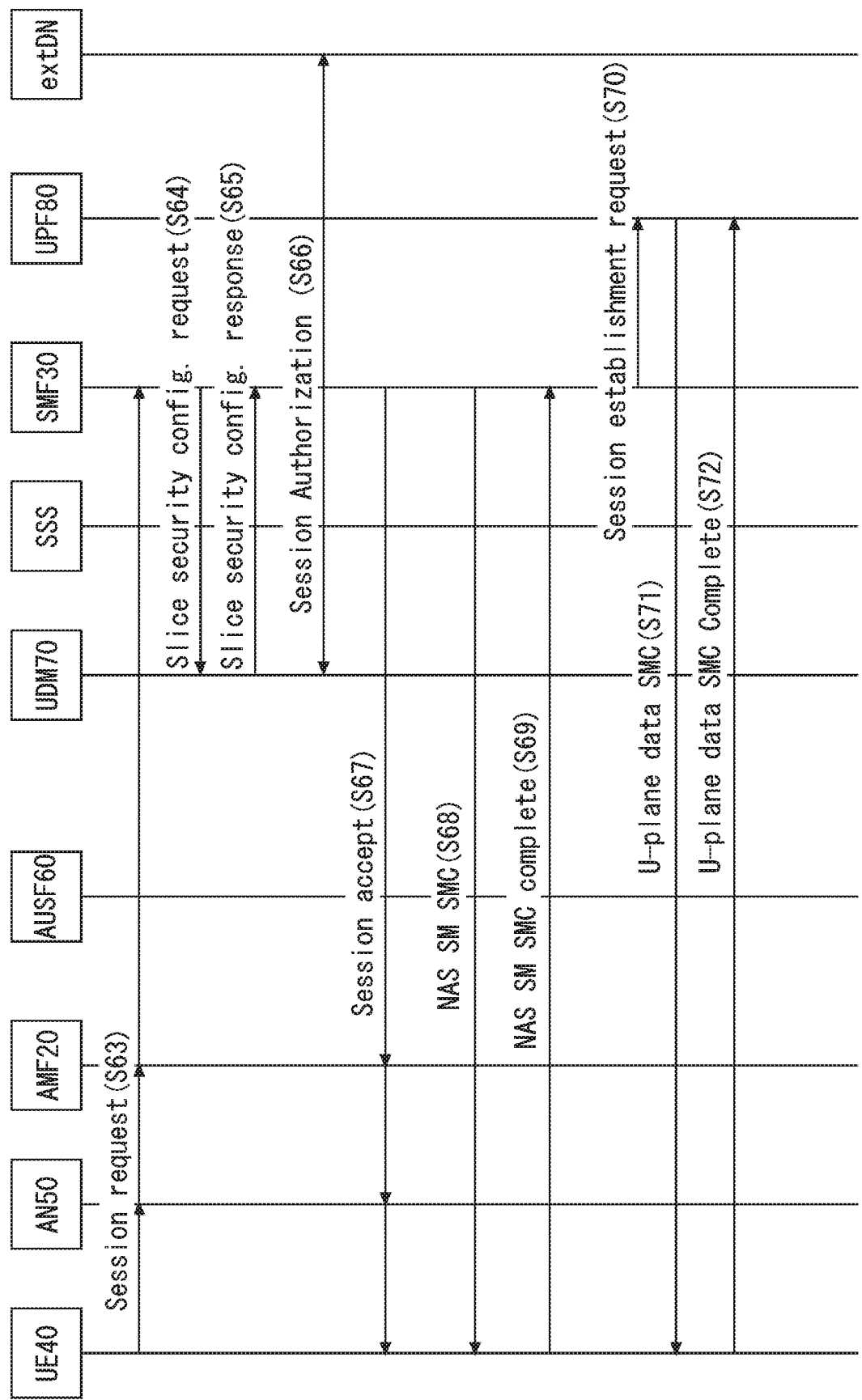
FIG. 20 is a diagram showing a flow of security processing according to the eighth example embodiment.

With reference next to FIGS. 19 and 20, a flow of security processing using a Slice Security Server (SSS) will be explained. The SSS provides appropriate security configuration for each network slice in order to deal with security required for each network slice. The SSS may be arranged in the same place as the UDM 70. In other words, the SSS may be collocated with the UDM 70.

First, the UE 40 sends a Registration request message to the AN 50 (S51). The Registration request message includes a Configured NSSAI. Further, the AN 50 selects the AMF 20 and forwards the Registration request message including the Configured NSSAI to the selected AMF 20 (S51).

Upon receiving the Registration request message, the AMF 20 extracts all the accessible SM-NSSAI (Acceptable SM-NSSAI). The SM-NSSAI is used to select the SMF. The SM-NSSAI is information for identifying the network slice to which the UE 40 wants to be connected. Further, the AMF 20 generates an Accepted NSSAI and a temp ID, and holds the NSSAI and the temp ID that have been generated. The AMF 20 sends an authentication data request message including the Accepted NSSAI and the temp ID to the AUSF 60. Further, the AUSF 60 forwards the authentication data request message to the UDM 70 (S52).

The AMF 20 or the AUSF 60 updates the NSSAI when the NSSAI sent from the UE 40 and the NSSAI recognized on the network side are different from each other. Further, when the UE 40 has not sent an effective NSSAI, the AMF 20 may execute a Network Slice Selection Function (NSSF) in order to select the network slice.

Next, the UDM 70 sends a security configuration request message to the SSS in order to acquire all the kinds of information regarding the security configuration that are required for the UE 40 (S53). Next, the SSS sends a security configuration response message to the UDM 70 (S54). The security configuration response message includes security configuration requested in the security configuration request message. The security configuration is stored in the SSS as a security profile. The security profile is composed of a set of security configurations such as an algorithm, a key length and the like. Further, the security profile is used in the UE 40 and a network slice to which the UE 40 wants to be connected. The security profile ID is sent to the UDM 70, the AUSF 60, the AMF 20, the UPF 80, the UE 40 and the like along with the security configuration.

Next, the UDM 70 selects related security configuration based on the service requirement of the UE 40 in order to establish the NAS MM security and the AS security. The UDM 70 selects, for example, an algorithm, a key length or the like (S55). The UDM 70 further generates Authentication Vectors (AVs) (S55).

Next, the UDM 70 sends an authentication data response message to the AUSF 60, and the AUSF 60 forwards the received authentication data response message to the AMF 20 (S56). The authentication data response message includes the selected security configuration and the AVs.

Next, AKA is executed between the UE 40 and the AMF 20 using the AVs provided by the UDM 70 (S57).

Next, the AMF 20 sends NAS MM SMC to the UE 40 (S58). The NAS MM SMC includes security configurations selected in the UDM 70. Next, the UE 40 sends a NAS MM SMC complete message to the AMF 20 (S59). Accordingly, the NAS MM security is established between the UE 40 and the AMF 20.

Next, the AMF 20 sends a Registration accept message to the AN 50 and the AN 50 forwards a Registration accept message to the UE 40 (S60). The Registration accept message includes security configurations and a temp ID.

Next, the AN 50 sends the AS SMC to the UE 40 (S61). The AS SMC includes security configuration selected by the UDM 70. Next, the UE 40 sends the AS SMC complete message to the AN 50 (S62). Accordingly, the AS security is established between the UE 40 and the AN 50. Here, when the RAN slicing is applied, the security configuration is provided for each slice and the AS security is established for each slice.

With reference next to FIG. 20, the UE 40 sends a Session request message to the AN 50, and the AN 50 forwards the Session request message to the AMF 20 (S63). The Session request message includes an SM-NSSAI and a temp ID. Further, the AMF 20 selects the SMF 30 based on information included in the Session request message and sends the Session request message to the SMF 30 (S63).

Next, the SMF 30 sends a Slice security configuration request message to the SSS when it does not hold configurations for establishing the NAS MM security and the U-plane data security (S64). The Slice security configuration request message includes an SM-NSSAI and a temp ID.

Next, the SSS sends a Slice security configuration response message including the requested configuration to the SMF 30 (S65).

Next, the SMF 30 selects the UPF 80, and Session authorization for accessing the extDN via the UPF 80 is executed (S66). Next, the SMF 30 sends a Session accept message to the UE 40 via the AMF 20 and the AN 50 (S67). Next, the SMF 30 sends NAS SM SMC including security configurations to the UE 40 (S68). Next, the UE 40 sends a NAS SM SMC complete message to the SMF 30 (S69). Accordingly, the NAS SM security is established between the UE 40 and the SMF 30.

Next, the SMF 30 sends a Session establishment request message including security configurations to the UPF 80 (S70). Next, the UPF 80 sends U-plane data SMC including the security configurations to the UE 40 (S71). Next, the UE 40 sends a U-plane data SMC complete message to the UPF 80 (S72). Accordingly, U-plane data security between the UE 40 and the UPF 80 is established.

As described above, by executing the security processing shown in FIGS. 19 and 20, it is possible to establish an appropriate security configuration for authentication and protection of the MM message in view of the requirements from UE and services. Further, it is possible to establish security configurations different for each network slice for protection of the SM message and the U-plane data.

Next, in the following description, a configuration example of the UE 40 and the AMF 20 described in the above example embodiments will be explained.

Figure 21:
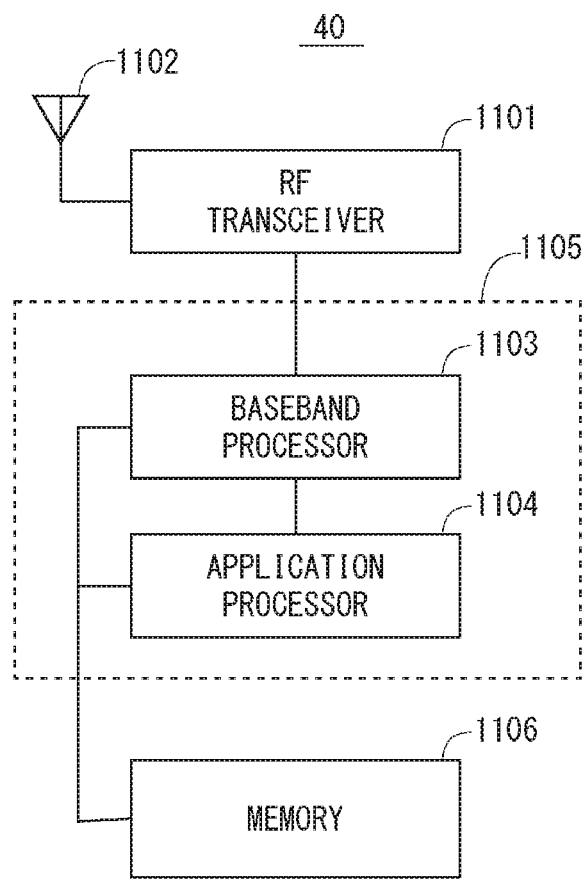
FIG. 21 is a configuration diagram of UE according to each of the example embodiments.

FIG. 21 is a block diagram showing a configuration example of the UE 40. A Radio Frequency (RF) transceiver 1101 performs analog RF signal processing to communicate with the AN 50. The analog RF signal processing performed by the RF transceiver 1101 includes frequency up-conversion, frequency down-conversion, and amplification. The RF transceiver 1101 is coupled to an antenna 1102 and a baseband processor 1103. That is, the RF transceiver 1101 receives modulated symbol data from the baseband processor 1103, generates a transmission RF signal, and supplies the transmission RF signal to the antenna 1102. The modulated symbol data may be an Orthogonal Frequency Division Multiplexing (OFDM) symbol data. Further, the RF transceiver 1101 generates a baseband reception signal based on a reception RF signal received by the antenna 1102 and supplies the baseband reception signal to the baseband processor 1103.

The baseband processor 1103 performs digital baseband signal processing (i.e., data-plane processing) and control-plane processing for radio communication. The digital baseband signal processing includes (a) data compression/decompression, (b) data segmentation/concatenation, and (c) composition/decomposition of a transmission format (i.e., transmission frame). The digital baseband signal processing further includes (d) channel coding/decoding and (e) modulation (i.e., symbol mapping)/demodulation. The digital baseband signal processing further includes (f) generation of OFDM symbol data (i.e., baseband OFDM signal) by Inverse Fast Fourier Transform (IFFT). Meanwhile, the control-plane processing includes communication management of layer 1, layer 2, and layer 3. The layer 1 is, for example, transmission power control. The layer 2 is, for example, radio resource management and hybrid automatic repeat request (HARQ) processing. The layer 3 is, for example, signaling regarding attach, mobility, and call management.

In the case of LTE and LTE-Advanced, for example, the digital baseband signal processing by the baseband processor 1103 may include, for example, signal processing of a Packet Data Convergence Protocol (PDCP) layer, a Radio Link Control (RLC) layer, a MAC layer, and a PHY layer. Further, the control-plane processing performed by the baseband processor 1103 may include processing of a Non-Access Stratum (NAS) protocol, an RRC protocol, and MAC CEs.

The baseband processor 1103 may include a modem processor that performs the digital baseband signal processing and a protocol stack processor that performs the control-plane processing. The modem processor is, for example, a Digital Signal Processor (DSP). The protocol stack processor, which performs the control-plane processing, may be, for example, a Central Processing Unit (CPU) or a Micro Processing Unit (MPU). In this case, the protocol stack processor, which performs the control-plane processing, may be integrated with an application processor 1104 described in the following.

The application processor 1104 is also referred to as a CPU, an MPU, a microprocessor, or a processor core. The application processor 1104 may include a plurality of processors (processor cores). The application processor 1104 loads a system software program and various application programs from a memory 1106 or from another memory (not shown) and executes these programs, thereby providing various functions of the UE 40. The system software program may be, for example, an Operating System (OS). The application program may be, for example, a call application, a WEB browser, a mailer, a camera operation application, or a music player application.

In some implementations, as represented by a dashed line (1105) in FIG. 21, the baseband processor 1103 and the application processor 1104 may be integrated on a single chip. In other words, the baseband processor 1103 and the application processor 1104 may be implemented in a single System on Chip (SoC) device 1105. An SoC device may be referred to as a system Large Scale Integration (LSI) or a chipset.

The memory 1106 is a volatile memory, a non-volatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1106 may include, for example, an external memory device that can be accessed from the baseband processor 1103, the application processor 1104, and the SoC 1105. The memory 1106 may include an internal memory device that is integrated in the baseband processor 1103, the application processor 1104, or the SoC 1105. Further, the memory 1106 may include a memory in a Universal Integrated Circuit Card (UICC).

The memory 1106 may store a software module (computer program) including instructions and data to perform the processing by the UE 40 described in the above embodiments. In some implementations, the baseband processor 1103 or the application processor 1104 may load this software module from the memory 1106 and execute the loaded software module, thereby performing the processing of the UE 40 described in the above embodiments.

Figure 22:
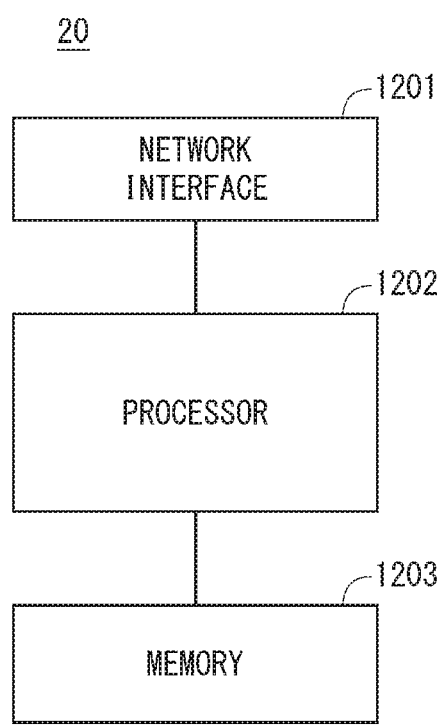
FIG. 22 is a configuration diagram of an AMF entity according to each of the example embodiments.

FIG. 22 is a block diagram showing a configuration example of the AMF 20. With reference to FIG. 22, the AMF 20 includes a network interface 1201, a processor 1202, and a memory 1203. The network interface 1201 is used to communicate with network nodes (e.g., the AN 50, the SMF 30 etc.) The network interface 1201 may include, for example, a network interface card (NIC) conforming to the Institute of Electrical and Electronics Engineers (IEEE) 802.3 series.

The processor 1202 loads software (computer programs) from the memory 1203 and executes the loaded software (computer programs), thereby performing processing of the AMF 20 described with reference to the sequence diagram and the flowchart in the above-described example embodiments. The processor 1202 may be, for example, a microprocessor, an MPU, or a CPU. The processor 1202 may include a plurality of processors.

The memory 1203 is composed of a combination of a volatile memory and a non-volatile memory. The memory 1203 may include a storage located apart from the processor 1202. In this case, the processor 1202 may access the memory 1203 via an I/O interface (not shown).

In the example shown in FIG. 22, the memory 1203 is used to store software modules. The processor 1202 may be configured to load the software modules from the memory 1203 and execute the loaded software modules, thereby performing processing of the AMF 20 described in the above embodiments.

As described above with reference to FIGS. 21 and 22, each of the processors included in the UE 40 and the AMF 20 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media, optical magnetic storage media (e.g., magneto-optical disks), Compact Disc Read Only Memory (CD-ROM), CD-R, CD-R/W, and semiconductor memories. The magnetic storage media may be flexible disks, magnetic tapes, hard disk drives, etc. The semiconductor memories may be, for example, mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The present disclosure is not limited to the above example embodiments and may be changed as appropriate without departing from the spirit of the present disclosure. Further, the present disclosure may be executed by combining the example embodiments as appropriate.

While the present disclosure has been described with reference to the example embodiments, the present disclosure is not limited to the aforementioned example embodiments. Various changes that can be understood by those skilled in the art can be made to the configurations and the details of the present disclosure within the scope of the present disclosure.

This application is based upon and claims the benefit of priority from Indian Patent Application No. 201711001823, filed on Jan. 17, 2017, and Indian Patent Application No. 201711003074, filed on Jan. 27, 2017, the disclosures of which are incorporated herein in its entirety by reference.

For example, the whole or part of the above embodiments can be described as, but not limited to, the following supplementary notes.

(Supplementary Note 1)
A communication system comprising:
a communication terminal;
an Access and Mobility Management (AMF) entity configured to execute Mobility Management (MM) processing regarding the communication terminal; and
a Session Management Function (SMF) entity configured to execute Session Management (SM) processing regarding the communication terminal, wherein
the communication terminal sends an MM message used in the MM processing, a first security key having been applied to the MM message, between the communication terminal and the AMF entity, and sends an SM message used in the SM processing, a second security key having been applied to the SM message, between the communication terminal and the SMF entity via the AMF entity.

(Supplementary Note 2)
The communication system according to Supplementary Note 1, wherein the SMF entity is associated with a first network slice included in a plurality of network slices generated by applying a network slicing.

(Supplementary Note 3)
The communication system according to Supplementary Note 2, wherein the AMF entity derives the second security key using identification information for identifying the first network slice and sends the second security key that has been derived to the SMF entity.

(Supplementary Note 4)

The communication system according to Supplementary Note 2 or 3, wherein the communication terminal derives the second security key using identification information for identifying the first network slice.

(Supplementary Note 5)

The communication system according to any one of Supplementary Notes 1 to 4, wherein the SMF entity is a Home (H)-SMF entity arranged in a home network of the communication terminal or a Visited (V)-SMF entity arranged in a roaming destination network of the communication terminal.

(Supplementary Note 6)

The communication system according to any one of Supplementary Notes 1 to 5, wherein the communication terminal sends the SM message to the AMF entity along with the MM message, and the AMF entity sends the SM message to the SMF entity.

(Supplementary Note 7)

The communication system according to any one of Supplementary Notes 1 to 5, wherein the communication terminal sends the SM message to which the first security key has been applied to the AMF entity along with the MM message, and the AMF entity sends the SM message to the SMF entity.

(Supplementary Note 8)

The communication system according to any one of Supplementary Notes 1 to 5, wherein the communication terminal sends the MM message including the SM message to the AMF entity, and the AMF entity sends the SM message to the SMF entity.

(Supplementary Note 9)

A communication system comprising:

a communication terminal;

an Access and Mobility Management (AMF) entity configured to execute Mobility Management (MM) processing regarding the communication terminal; and a Session Management Function (SMF) entity configured to execute Session Management (SM) processing regarding the communication terminal, wherein the communication terminal and the AMF entity apply a first security key to an MM message used in the MM processing, and the AMF entity and the SMF entity apply a Network Domain Security (NDS) to an SM message used in the SM processing.

(Supplementary Note 10)

The communication system according to Supplementary Note 9, wherein the SMF entity includes a first SMF entity associated with a first network slice included in a plurality of network slices generated by applying a network slicing and a second SMF entity associated with a second network slice included in the plurality of network slices, the AMF entity and the first SMF entity apply an NDS to a first SM message used in the SM processing, and the AMF entity and the second SMF entity apply a second security key that is different from the first security key to a second SM message used in the SM processing.

(Supplementary Note 11)

The communication system according to Supplementary Note 9, wherein the SMF entity is a Home (H)-SMF arranged in a home network of the communication terminal or a Visited (V)-SMF arranged in a roaming destination network of the communication terminal.

(Supplementary Note 12)

The communication system according to any one of Supplementary Notes 9 to 11, wherein the communication terminal sends the SM message to which the first security key has been applied to the AMF entity along with the MM message, and the AMF entity sends the SM message to the SMF entity.

(Supplementary Note 13)

The communication system according to any one of Supplementary Notes 1 to 5, wherein the communication terminal sends the MM message including the SM message to the AMF entity, and the AMF entity sends the SM message to the SMF entity.

(Supplementary Note 14)

The communication system according to Supplementary Note 10, wherein the communication terminal sends the first SM message and the second SM message to which the first security key has been applied to the AMF entity along with the MM message, and the AMF entity sends the first SM message to the first SMF entity and sends the second SM message to the second SMF entity.

(Supplementary Note 15)

A communication terminal comprising:

control means for applying a first security key to an MM message used in MM processing and applying a second security key to an SM message used in SM processing; and communication means for sending the MM message to which the first security key has been applied to an AMF entity that executes the MM processing and sending the SM message to which the second security key has been applied to the SMF entity that executes the SM processing via the AMF entity.

(Supplementary Note 16)

The communication terminal according to Supplementary Note 15, wherein the communication terminal derives the second security key using identification information for identifying a first network slice included in a plurality of network slices generated by applying a network slicing.

(Supplementary Note 17)

An AMF entity comprising:

control means for executing MM processing using an MM message to which a first security key has been applied; and communication means for forwarding an SM message sent between a communication terminal and an SMF entity that executes SM processing, a second security key having been applied to the SM message.

(Supplementary Note 18)

The AMF entity according to Supplementary Note 16, wherein the control means derives the second security key, and the communication means sends the second security key that has been derived to the SMF entity.

(Supplementary Note 19)

A communication method in a communication terminal, the method comprising:

applying a first security key to an MM message used in MM processing;

sending the MM message to which the first security key has been applied to an AMF entity that executes the MM processing;

applying a second security key to an SM message used in SM processing; and sending the SM message to which the second security key has been applied to the SMF entity that executes the SM processing via the AMF entity.

REFERENCE SIGNS LIST

10 COMMUNICATION TERMINAL
20 AMF
21 CONTROLLER
22 COMMUNICATION UNIT
30 SMF
31 V-SMF
32 H-SMF
40 UE
41 CONTROLLER
42 COMMUNICATION UNIT
50 AN
60 AUSF
70 UDM
80 UPF
81 V-UPF
82 H-UPF
90 PCF
91 V-PCF
92 H-PCF
100 AF
110 DN

The invention claimed is:

1. A communication system comprising:
a communication terminal;
an Access and Mobility Management Function (AMF) entity; and
a Session Management Function (SMF) entity,
wherein:
the AMF entity comprises:
at least one memory storing instructions, and
at least one processor configured to execute the instructions to:
execute Mobility Management (MM) processing regarding the communication terminal,
the SMF entity comprises
at least one memory storing instructions, and
at least one processor configured to execute the instructions to:
execute Session Management (SM) processing regarding the communication terminal,
the communication terminal comprises:
at least one memory storing instructions, and
at least one processor configured to execute the instructions to:
send an MM message used in the MM processing, a first security key having been applied to the MM message, between the communication terminal and the AMF entity, and send an SM message used in the SM processing, a second security key having been applied to the SM message, between the communication terminal and the SMF entity via the AMF entity.

2. The communication system according to claim 1, wherein the SMF entity is associated with a first network slice included in a plurality of network slices generated by applying a network slicing.

3. The communication system according to claim 2, wherein the at least one processor of the AMF entity is further configured to execute the instructions to derive the second security key using identification information for identifying the first network slice and send the second security key that has been derived to the SMF entity.

4. The communication system according to claim 2, wherein the at least one processor of the communication terminal is further configured to execute the instructions to derive the second security key using identification information for identifying the first network slice.

5. The communication system according to claim 1, wherein the SMF entity is a Home (H)-SMF entity arranged in a home network of the communication terminal or a Visited (V)-SMF entity arranged in a roaming destination network of the communication terminal.

6. The communication system according to claim 1, wherein
the at least one processor of the communication terminal is further configured to execute the instructions to send the SM message to the AMF entity along with the MM message, and
the at least one processor of the AMF entity is further configured to execute the instructions to send the SM message to the SMF entity.

7. The communication system according to claim 1, wherein
the communication terminal sends the SM message to which the first security key has been applied to the AMF entity along with the MM message, and
the AMF entity sends the SM message to the SMF entity.

8. The communication system according to claim 1, wherein
the at least one processor of the communication terminal is further configured to execute the instructions to send the MM message including the SM message to the AMF entity, and
the at least one processor of the AMF entity is further configured to execute the instructions to send the SM message to the SMF entity.

9. A communication terminal comprising:
at least one memory storing instructions, and
at least one processor configured to execute the instructions to:
apply a first security key to an MM message used in MM processing and apply a second security key to an SM message used in SM processing; and
send the MM message to which the first security key has been applied to an AMF entity that executes the MM processing and send the SM message to which the second security key has been applied to an SMF entity that executes the SM processing via the AMF entity.

10. The communication terminal according to claim 9, wherein the at least one processor of the communication terminal is further configured to execute the instructions to derive the second security key using identification information for identifying a first network slice included in a plurality of network slices generated by applying a network slicing.

11. An AMF entity comprising:
at least one memory storing instructions, and
at least one processor configured to execute the instructions to:
execute MM processing using an MM message to which a first security key has been applied; and
forward an SM message sent between a communication terminal and an SMF entity that executes SM processing, a second security key having been applied to the SM message.

12. The AMF entity according to claim 11, wherein the at least one processor of the AMF entity is further configured to derive the second security key, and send the second security key that has been derived to the SMF entity.

* * * * *